(12) United States Patent
Stefik et al.

(10) Patent No.: US 11,934,410 B2
(45) Date of Patent: Mar. 19, 2024

(54) COMPUTER-IMPLEMENTED SYSTEM AND METHOD FOR GENERATING RECURRING EVENTS

(71) Applicant: Conduent Business Services, LLC, Florham Park, NJ (US)

(72) Inventors: Mark J. Stefik, Portola Valley, CA (US); Daniel G. Bobrow, Palo Alto, CA (US); Hoda Eldardiry, San Carlos, CA (US); Robert T. Krivacic, San Jose, CA (US); Pai Liu, Sunnyvale, CA (US); Sureyya Tarkan, Palo Alto, CA (US); Ed Wu, San Jose, CA (US)

(73) Assignee: Conduent Business Services, LLC, Florham Park, NJ (US)

( * ) Notice: Subject to any disclaimer, the term of this patent is extended or adjusted under 35 U.S.C. 154(b) by 321 days.

(21) Appl. No.: 16/036,762

(22) Filed: Jul. 16, 2018

(65) Prior Publication Data
US 2018/0322172 A1   Nov. 8, 2018

Related U.S. Application Data

(62) Division of application No. 14/578,226, filed on Dec. 19, 2014, now Pat. No. 10,025,829.

(51) Int. Cl.
*G06F 16/248* (2019.01)
*G06F 16/23* (2019.01)
(Continued)

(52) U.S. Cl.
CPC .... *G06F 16/24575* (2019.01); *G06F 16/2379* (2019.01); *G06F 16/2455* (2019.01);
(Continued)

(58) Field of Classification Search
CPC ........... G06Q 10/0637; G06Q 10/0639; G06Q 10/10; G06F 16/24575; G06F 16/2379;
(Continued)

(56) References Cited

U.S. PATENT DOCUMENTS

| 7,206,732 B2 | 4/2007 | Williams et al. |
| 7,392,169 B2 | 6/2008 | Gabele et al. |

(Continued)

FOREIGN PATENT DOCUMENTS

| EP | 2407917 | 1/2012 |
| WO | 2000060455 | 10/2000 |

(Continued)

OTHER PUBLICATIONS

Allan et al., On-line New Event Detection and Tracking, SIGIR'98, Melbourne, Australia @ 1998 ACM I-58113-015-5, pp. 1-9. (Year: 1998).*

(Continued)

*Primary Examiner* — Cheyne D Ly
(74) *Attorney, Agent, or Firm* — Krista A. Wittman

(57) ABSTRACT

A computer-implemented system and method for planning recurring events is provided. Event objects for events are stored in a database. A trigger notifying the beginning of an event is received and an event object representing the event is generated in response to the trigger. An event class is associated with a set of parameters and is assigned to the event object. A set of activity data is created for the event object and each activity data includes structured and unstructured data describing an event activity occurred during the event. At least one event object is retrieved from the database as a model and the parameter values of the model event object are displayed. At least one of the parameter values of the model event object is modified and the modification is reflected against other parameter values (Continued)

of the model event object that are dependent on the modified parameter value.

20 Claims, 38 Drawing Sheets

(51) Int. Cl.
  *G06F 16/2455* (2019.01)
  *G06F 16/2457* (2019.01)
  *G06F 16/2458* (2019.01)
  *G06Q 10/0637* (2023.01)
  *G06Q 10/0639* (2023.01)

(52) U.S. Cl.
  CPC ........ *G06F 16/2477* (2019.01); *G06F 16/248* (2019.01); *G06Q 10/0637* (2013.01); *G06Q 10/0639* (2013.01)

(58) Field of Classification Search
  CPC . G06F 16/2455; G06F 16/2477; G06F 16/248
  See application file for complete search history.

(56) References Cited

U.S. PATENT DOCUMENTS

| | | |
|---|---|---|
| 7,424,715 B1 | 9/2008 | Dutton |
| 8,346,777 B1* | 1/2013 | Auerbach ............. G06F 16/951 707/741 |
| 8,364,519 B1 | 1/2013 | Basu et al. |
| 8,731,994 B2 | 5/2014 | Kass et al. |
| 8,751,492 B1 | 6/2014 | Catane |
| 9,892,168 B1* | 2/2018 | Apreleva ............. G06F 16/2477 |
| 9,952,742 B2* | 4/2018 | Plesur ..................... G06F 3/048 |
| 2002/0027502 A1 | 3/2002 | Mayor |
| 2003/0212612 A1 | 11/2003 | Al-Azzawe |
| 2005/0223027 A1* | 10/2005 | Lawrence ............... G06F 16/90 |
| 2006/0074621 A1* | 4/2006 | Rachman ............... G06Q 90/00 703/22 |
| 2006/0271526 A1* | 11/2006 | Charnock ............... G06Q 30/02 |
| 2007/0198323 A1 | 8/2007 | Bourne et al. |
| 2008/0091628 A1 | 4/2008 | Srinivasa et al. |
| 2008/0301175 A1* | 12/2008 | Applebaum ...... G06F 16/24573 |
| 2009/0205018 A1* | 8/2009 | Ferraiolo ............ G06F 21/6218 726/1 |
| 2010/0198655 A1 | 8/2010 | Ketchum et al. |
| 2012/0191502 A1 | 7/2012 | Gross et al. |
| 2013/0173351 A1* | 7/2013 | Livne ............... G06Q 10/06395 705/7.38 |
| 2013/0246089 A1 | 9/2013 | Gross et al. |
| 2014/0095425 A1 | 4/2014 | Sipple |
| 2014/0207950 A1 | 7/2014 | Badiee et al. |

FOREIGN PATENT DOCUMENTS

| | | | |
|---|---|---|---|
| WO | 2007044875 | 4/2007 | |
| WO | WO-2009046435 A1 * | 4/2009 | ............. G06F 16/48 |

OTHER PUBLICATIONS

Malone et al., "The Information Lens: An Intelligent System for Information Sharing in Organizations," Center for Information Systems Research, p. 2-21, Jan. 1986.

Lai et al., "Object Lens: A 'Spreadsheet' for Cooperative Work," Association for Computing Machinery, p. 1-36, Sep. 1988.

Heer et al., "Voyagers and Voyeurs: Supporting Asynchronous Collaborative Information Visualization," Proceedings of the ACM Conference on Human Factors in Computing Systems (CHI), Apr. 28-May 3, 2007, San Jose, CA.

Kholief et al., "Event-Based Retrieval from Digital Libraries Containing Streamed Data," Research and Advanced Technology for Digital Libraries, vol. 2163, pp. 300, 2001 (Year: 2001).

* cited by examiner

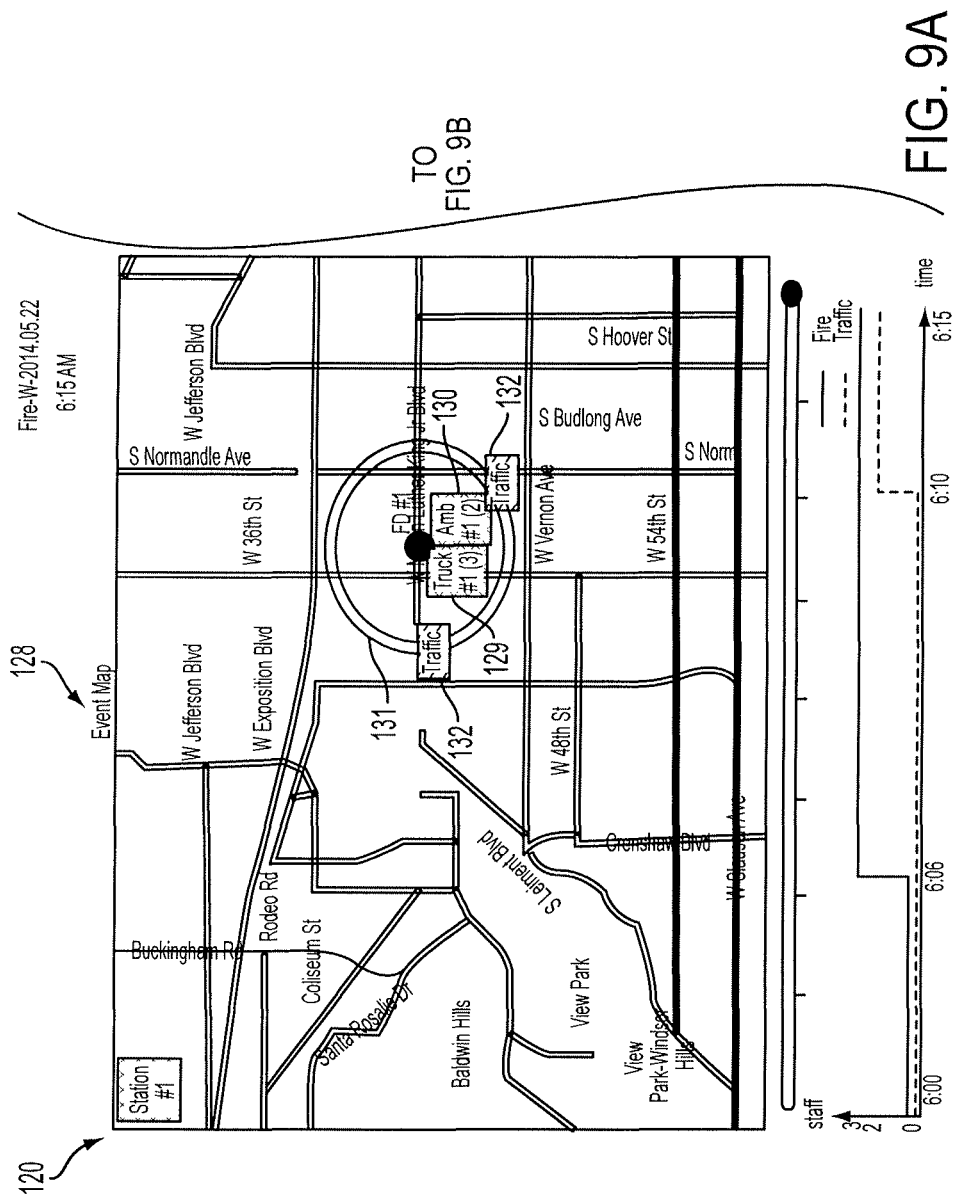

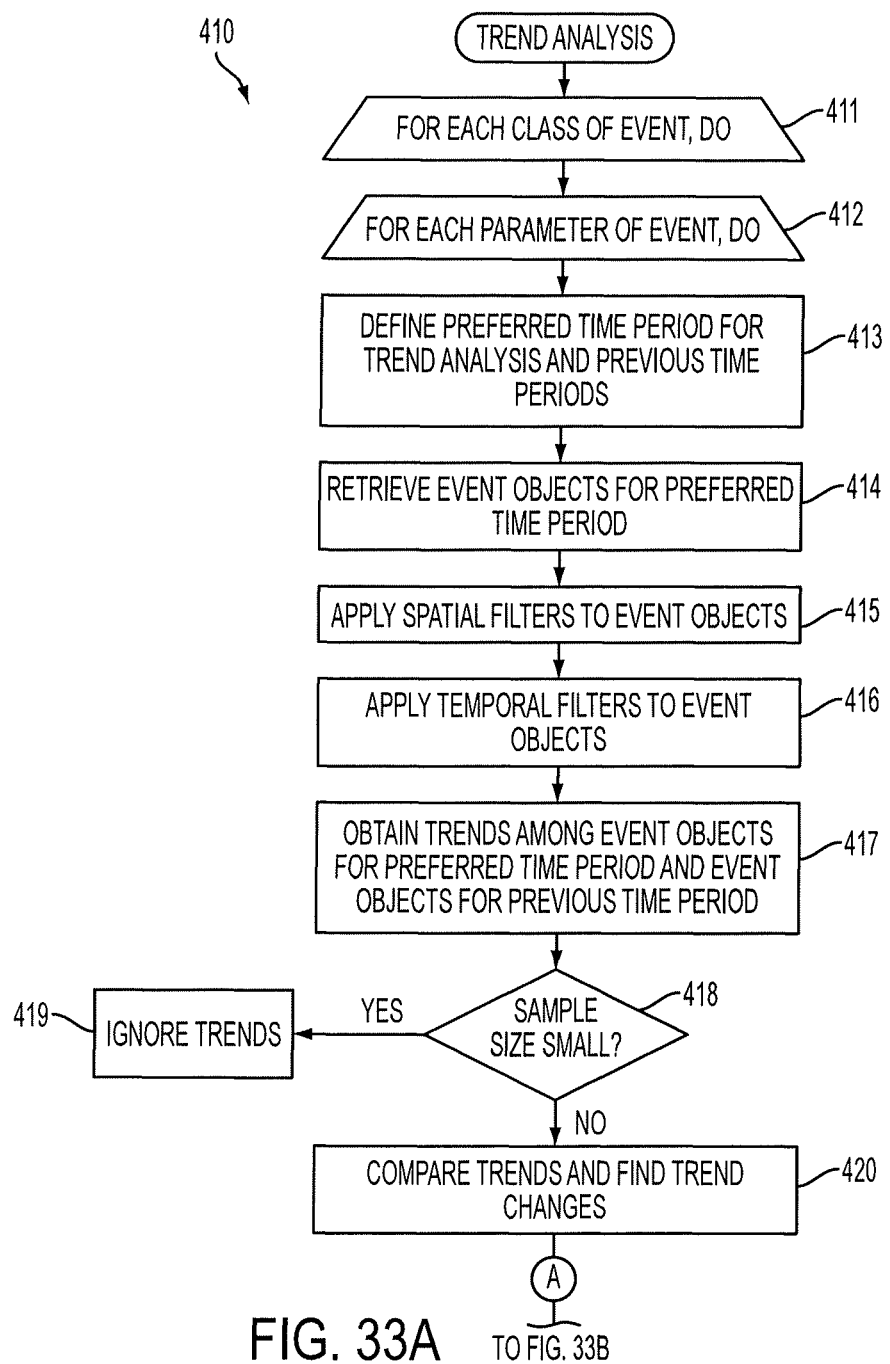

COMPUTER-IMPLEMENTED SYSTEM AND METHOD FOR GENERATING RECURRING EVENTS

CROSS-REFERENCE TO RELATED APPLICATION

This patent application is a divisional of U.S. Pat. No. 10,025,829, issued Jul. 17 2018, the disclosure of which is incorporated by reference.

FIELD

This application relates in general to collecting and analyzing organizational data and, in particular, to a computer-implemented system and method for generating recurring events.

BACKGROUND

Large organizations with multiple mobile locations, such as governments, hospitals, banks, companies, and universities, carry out services in complex operational settings and process a tremendous amount of day-to-day transactions. Properly managing each level of organizational operations helps the organization as a whole to smoothly function. When organizations have mobile workers or workers at multiple sites, the need to organize and process the data of each worker's daily activities for an operating system for the organization is recognized as all the information regarding the workers' activities conveyed remotely is not timely reflected back to the organizational knowledge base. For example, local governments typically provide a variety of types of public services on a daily basis, including police, fire, emergency services, transportation, and so on. Similarly, hospitals also provide services varying from patient to patient. However, current knowledge base for organizations is not capable of collecting and incorporating all of the data obtained during the performance of their services into the business operations. Thus, the performance of the organizations is not satisfactorily analyzed from the unorganized and unincorporated daily activity data.

Performance of an organization can be evaluated by examining how the organization complies with their purpose and policy. For example, fire departments must quickly respond to unanticipated fire events and they need to use their resources efficiently. Traffic control and parking organizations need to have certain revenues from enforcement activities but also need to balance their activities between enforcement and other public service activities. Workers in hospitals, such as doctors and nurses, need to handle patients who have different health issues in various urgent levels quickly and efficiently with their resources. To properly carry out services in conformity with their purposes and policies, an organization must have a way to track each single activity occurring in real time and to analyze the impacts of the activity in terms of performance as an organization.

Traditionally, to evaluate activities taken by workers in an organization for a certain event, managers or supervisors in the organization first collect information manually from informal notes, calendars, emails, logs, and so on, to review and analyze the organizational performance. Then, they manually organize the activity information to a series to summarize the activities for the event in a report for further analysis. When the managers and supervisors plan for a new event, they first retrospectively examine the impact of past events using the information only from the report at-hand and then forecast future resource demands. Such traditional methods do not provide convenient ways of collecting, organizing, reviewing, or planning of the event data.

Although the activity data can be digitally encoded and retrospectively maintained in a database, association with events has not been easily made. The events are episodic data that can happen at a given place and time. The events can include accidents, fires, storms, sporting events, film projects, or health care for patients in the hospital. Thus, the events can be planned or unplanned, and may last for various periods of time.

Typically, organizations respond to an event and take actions as the event unfolds, but data regarding the activities performed by the organizations are recorded into a certain database without satisfactory association with the events. Thus, the organizational activity data related to a particular event cannot be readily distinguished from other organizational activity data and analysis particular to each event or class of events is impracticable. Further, when analyzing the events to understand the organizational performance, a lack of data regarding activities by workers for the events causes incomplete comprehension of each event or events as a whole. In other words, each event cannot be fully analyzed for characterization or modeling, which is important for managing organizational operations.

Thus, there is a need for collecting real-time organizational activity data in association with an event and efficiently and accurately analyzing performance of the organization from the collected organizational activity data for the event.

SUMMARY

An episodic analytic system produces an association between organizational activity data and events and performs analytics about activities on event related data to evaluate organizational performance. Initially, the system creates an event object for digitally organizing all the activity data related to an event. The event object represents each event instance and is categorized in a class of events. Each event class is associated with a set of parameters that are used for analysis of the event object. The event object may optionally be assigned tags for classification. Then all the organizational activity data related to the event is collected from workers including mobile workers. The activity data can include structured data and unstructured data. Each of the organizational activity data may also be associated with tags. The activity data comprised in the event objects are processed for a variety of analytics. The analytics data for the event objects can be queried based on search filters and displayed on a user dashboard.

Further, the analytics data for the event objects can be used for planning future events. In addition, the analytics data for the event objects can be used for discovering trends of the event objects for a certain time period.

One embodiment provides a computer-implemented method for planning recurring events. Event objects for events are maintained in a database. A trigger for notifying the beginning of an event is received. An event object representing the event is generated in response to the trigger. An event class is assigned to the event object and the event class is associated with a predefined set of parameters. A set of activity data is created for the event object and each activity data includes structured and unstructured data describing an event activity occurred during the event. Each of the activity data is associated with tags. For each of the event objects, analytics of the event object are performed and values for the parameters of the event object are calculated. One event object from the database is retrieved as a model and the parameter values of the model event object are displayed on a display. At least one of the parameter values of the model event object is modified based on the modification received from a planner. The modification is reflected to other parameter values of the model event object that are dependent on the modified parameter values. All the parameter values of the model event object are displayed on the display for review.

A further embodiment provides a computer-implemented system and method for planning recurring events. Event objects for events are stored in a database. A trigger notifying the beginning of an event is received and an event object representing the event is generated in response to the trigger. An event class is associated with a set of parameters and is assigned to the event object. A set of activity data is created for the event object and each activity data includes structured and unstructured data describing an event activity occurred during the event. At least one event object is retrieved from the database as a model and the parameter values of the model event object are displayed. At least one of the parameter values of the model event object is modified and the modification is reflected against other parameter values of the model event object that are dependent on the modified parameter value.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 9A-9B are screenshots showing, by way of example, the real-time dashboard displaying arrival of the Truck #1 and Ambulance #1, and traffic control by traffic officers on both the event map and the log.

FIGS. 33A-33B are flow diagrams showing a routine for performing trend analysis for use in the method of FIG. 2.

DETAILED DESCRIPTION

Figure 1A:
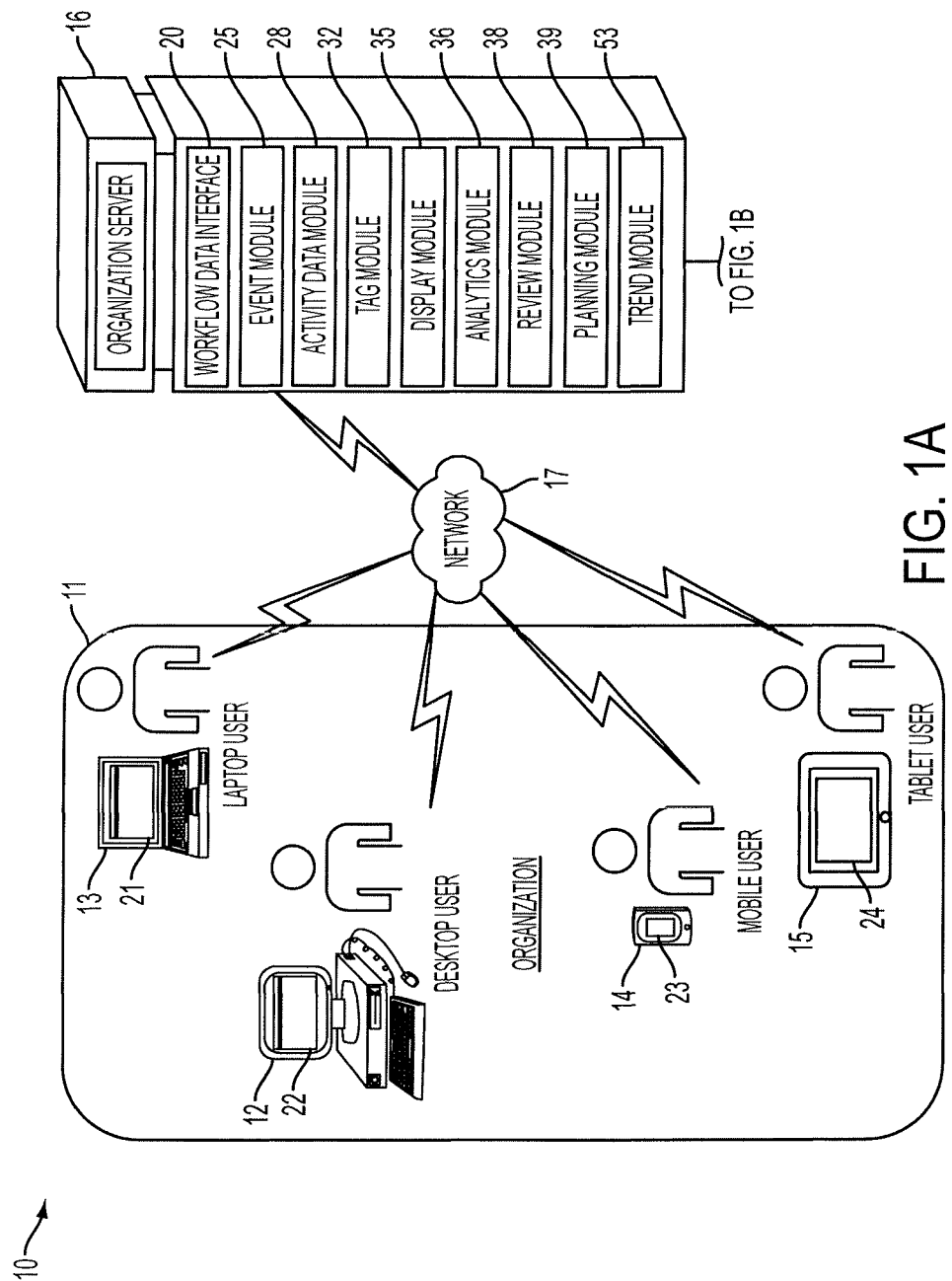
FIGS. 1A-1B are functional block diagrams showing a computer-implemented system for analyzing organizational performance from episodic data in accordance with one embodiment.
Figure 1B:
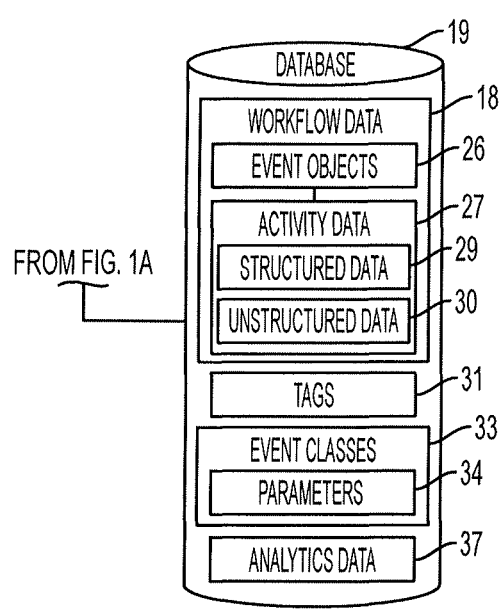

Organizational activity data associated with events are properly tracked, classified, and used for analytics for reviewing and planning through the episodic analytic system. FIGS. 1A-1B are functional block diagrams showing a computer-implemented system 10 for analyzing organizational performance from episodic data in accordance with one embodiment. An organization 11, such as a fire department, police department, and hospital, employs many workers for various roles in the organization. Some of the workers are remotely working at multiple sites for performing their roles. The mobile workers can be firefighters, police officers, traffic control officers, parking enforcement officers, doctors, nurses, and other medical technicians. Other types of mobile workers are possible. Those mobile workers can remotely access an organization server 16 over a wide area public data communications network 17, such as the Internet, using wired or wireless connections via a desktop 12, portable 13, or mobile 14, 15 computers.

Figure 3:
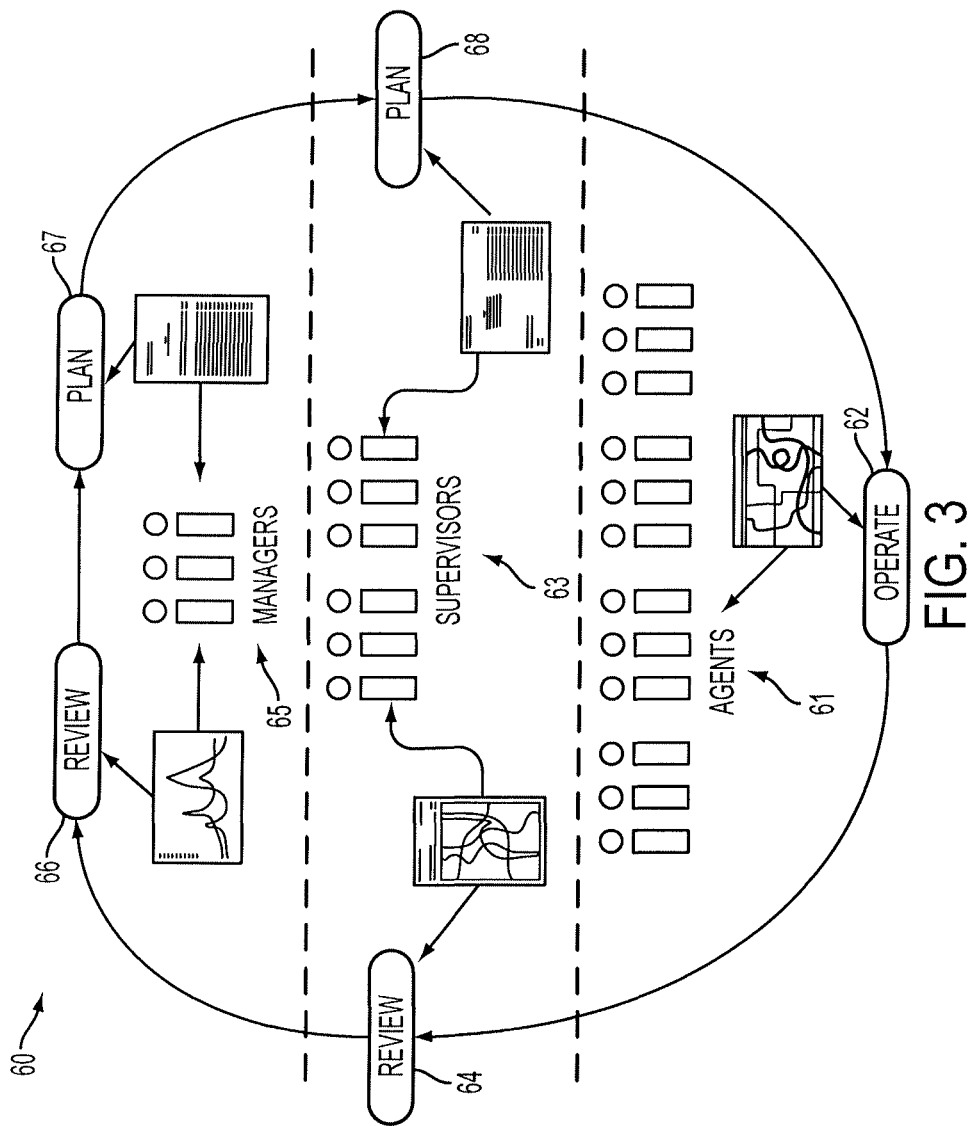
FIG. 3 is a process flow diagram showing, by way of example, an organizational workflow for use in the method of FIG. 2.

The organization server 16 manages a large scale of organizational workflow data 18 necessary for operating all the transactions and other organization specific matters, as further described infra with reference to FIG. 3. The mobile workers can access the workflow data 18 stored in a database 19 interconnected to the organization server 16 through a workflow data interface 20 while they perform their tasks. The workflow data 18 can be provided to computers 12-15 of the mobile workers through a Web interface 21, 22 or a graphical user interface 23, 24, such as a dashboard application, as well as other types of user interfaces. For instance, mobile workers use the user interfaces to send their locations through their computers 12-15 and texts describing their activities, take and send photographs and videos, and so on.

The workflow data 18 manages routines and regular tasks conducted in an organization on a daily basis and contains mostly objective quantified data. For instance, the workflow data 18 for city transportation departments can include parking violation data, ongoing construction data, and traffic congestion data. As another example, the workflow data 18 for public safety organizations can include accident data and citation data. As further another example, the workflow data 18 for fire departments can include fire event data. Other types of workflow data 18 are possible.

An event module 25 generates an event object 26 when an event occurs. The event object 26 can be generated manually or automatically when a certain trigger is received. An event object 26 is a digital representation of an event and stores all the activities in relation to the event, such as time and location of the event, people involved in the event, or a type of the event. Other types of information can be stored as an event object 26. The database 19 maintains the event objects 26 as a part of the workflow data 18. For each event object 26, one or more event classes 33 are assigned. The event classes 33 help to organize and classify the event objects 26 so that each event object can be retrieved by search based on the classification of the event classes 33. Each event class 33 is assigned a set of parameters 34 to specify types of analytics performed for the corresponding event object 26.

While stationary workers and mobile workers are accessing the workflow data 18, they can create activity data 27 as a part of the event object 26 through the user interfaces 21-24 via the computers 12-15. The activity data 27 can take various forms, as further described infra with reference to FIG. 4, and can include structured data 29 that can characterize details of activities by workers, such as which actor conducted what kind of action at where and when. For example, the structured data 29 can include an identify of a worker, an organizational position or group of the worker, daily assignment records, past performance, alarms from fire alarm systems or other sensors, GPS readings, and check-in/check-out status of the worker. Other types of structured data are possible. The activity data 27 can also include unstructured data 30 that provides additional information to the structured data. For examples, the unstructured data 30 can include texts, pictures, videos, and sound recordings. Other types of unstructured data are possible.

An activity data module 28 recognizes the structured data 29 and unstructured data 30 received from the stationary workers and mobile workers through the workflow data interface 20 and stores the structured data 29 and unstructured data 30 in the database 19. Once the activity data 27 is generated and received by the activity data module 28, the activity data 27 can be tagged with tags 31 as they are created through the workflow data interface 20, as further described infra with reference to FIG. 6. In one embodiment, the tags 31 can be generated at a later time.

A tag module 32 can automatically create tags 31 associated with the activity data, such as time and location data, an identifier of creators who transmit or create the activity data, and so on. Other types of information can be automatically tagged with the activity data 27. Further, the tag module 32 can provide predefined tags 31 for the workers to select the best matched tag to describe the activity data, including types, purposes, and nature or context of the activities. Other types of predefined tags are possible. In a further embodiment, the tags 31 can be manually entered by the workers to indicate further details of the activity data 27, such as priority of the activity data 27, metrics regarding the activity data 27, and so on. Other types of manual inputs for the tags are possible. All the automatic tags, predefined tags, and manually entered tags are maintained in the database 19.

A display module 35 sends the event object 26 tagged with the activity data 27 for display on the user interfaces 21-24. By an analytics module 36, the activity data 27 associated with tags 31 is used for obtaining various analytics data 37. The analytics data 38 can be quantitative and qualitative data and retrieved from the database by search. A review module 38 can search event objects 26 by using queries based on event classes 33 and the display module 35 displays a list of event objects 26 obtained through the search. The analytic data 38 can be shown in maps, timelines, charts, tables, and other structures on a display of the computers 12-15 used by the stationary workers and mobile workers, as further described infra with reference to FIGS. 5, 7-14, 16-18, 20, 21, and 26-31. Further, a planning module 39 can plan a future event based on the analytics data 37 of the previous event objects 26 stored in the database 19. In addition, a trend module 53 can discover a trend among activity data in a certain period of time using the analytics data 37.

The analytics data 37 for reviewing, planning, and analyzing trends are displayed on a display, such as through a dashboard application of a user interface. The dashboard application can adopt to a variety of analytics data 37 such as dynamic or static data. A real-time dashboard application can dynamically display the on-going activity data 27 related to an event object 26, such as on-going locations of the activities by the workers on a map, chronologically listed logs of the activity data. Other formats of the real-time dashboard application are possible. A review dashboard application can display a list of event objects 26 which are searched using queries. For instance, a Fire Chief can request fire events over the last 10 years and display the data about the events on a dashboard application on a summary panel. Once the Fire Chief selects one fire event, the summary of the selected event can be displayed. Other formats of the review dashboard are possible.

Each computer 12-15 includes components conventionally found in general purpose programmable computing devices, such as essential processing unit, memory, input/output ports, network interfaces, and known-volatile storage, although other components are possible. Mobile computers possess location-sensing devices, such as Global Positioning Systems or equivalent systems, clocks, cameras, and other sensors common to mobile phones and tablets. Additionally, the computers 12-15 and organization server 16 can each include one or more modules for carrying out the embodiments disclosed herein. The modules can be implemented as a computer program or procedure written as a source code in a conventional programming language and is presented for execution by the central processing unit as object or byte code or written as inter-credit source code in a conventional interpreted programming language inter-credit by a language interpreter itself executed by the central processing unit as object, byte, or inter-credit code. Alternatively, the modules could also be implemented in hardware, either as intergraded circuitry or burned into read-only memory components. The various implementation of the source code and object byte codes can be held on a computer-readable storage medium, such as a floppy disk, hard drive, digital videodisk (DVD), random access memory (RAM), read-only memory (ROM), and similar storage mediums. Other types of modules and module functions are possible, as well as other physical hardware components.

Figure 2:
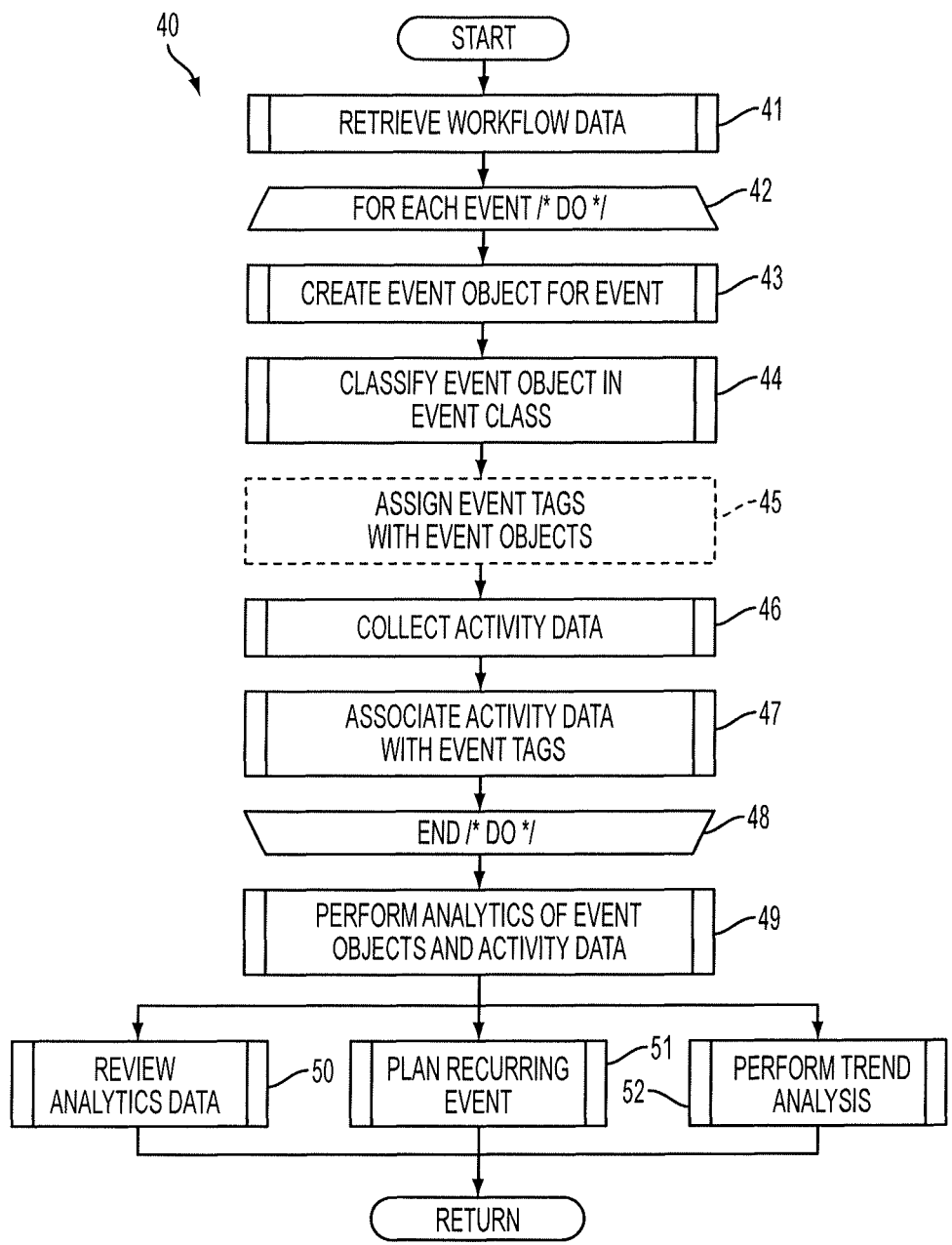
FIG. 2 is a flow diagram showing a computer-implemented method for collecting and analyzing organizational performance from episodic data in accordance with one embodiment.

A combination of tracking, classifying, and analyzing data regarding day-to-day organizational activities is necessary to review performance of the organization in different aspects. Without such management of data, the organization cannot accurately and efficiently review, forecast, plan, and understand organizational performance responding to variable events. FIG. 2 is a flow diagram showing a computer-implemented method 40 for analyzing organizational performance from episodic data in accordance with one embodiment. Routine tasks and transactions necessary to operate the organization are often digitally managed by an organizational operating system. The organization operating system can be a standard, enterprise-wide collection of business processes and can run complex business programs, such as workflow management systems, payroll management systems, human resources management systems, and so on. The workflow management system is software for monitoring a defined sequence of tasks, arranged as a workflow. The workflow management system defines each task for an individual or a group of individuals in the organization and monitors ongoing processes regarding the task. Workflow data can be displayed for an individual through a user interface, such as a graphical user interface application or mobile application, to perform the task (step 41).

A typical workflow management system is capable of controlling multiple levels of tasks and individuals in the organization. By way of example, FIG. 3 is a process flow diagram showing an organizational workflow 60 for use in the method of FIG. 2. In this example, three levels of individuals are involved in the organizational workflow, including agents 61, supervisors 63, and managers 65. Agents 61 operate 62 individual tasks. Information regarding the individual tasks are collected as activity data and stored in a database in relation to an event object. Then, the activity data is processed for analytics and displayed on a user interface as requested for review. Supervisors 63 can review the activity data and event objects along that information is created real time or review at a later time, such as weekly or monthly. Further, supervisors 63 can review the analytics data to analyze performance of each agent or as an organization. On the other hand, managers and directors 65 can oversee the organization and take responsibility on the activities in the organization as a whole. Managers 65 typically review 66 analytics data, which is statistically processed to show any trend in a data set or course of actions requiring immediate attentions by the managers 65. Such reviews can occur quarterly or yearly. Then, the managers 65 can plan 67 a long-term goals to achieve certain outcomes beneficial for the organization. Once the long-term goals are made and the supervisors 63 are informed about the plan, the supervisors 63 create further plans 68 for each new event by using the information of previous event objects. Once the future plans are forecast, agents 61 can prepare and perform each tasks efficiently.

Referring back to FIG. 2, information regarding activities for each event is collected (steps 42-47). Once an event occurs and a trigger for notifying the beginning of the event is received, a corresponding event object is created for representing the event (step 43). The event objects are typically created in response to automatic triggers, such as alarms, phone calls, detection by sensors, and so on, as further described infra with reference to FIG. 5. For instance, the episodic analytics system automatically can create a fire event object when a smoke detector goes off in a cafeteria of a department store and sends an alarm message to a fire logging system. In a further embodiment, workers, such as mobile workers and stationary workers, can manually create the event objects when the workers acknowledge an occurrence of an event. For instance, a fire dispatcher sees a fire alarm message arrived in the dispatch system and creates a fire event object. Other forms of creating an event object are possible. The created event objects are assigned with event classes that specify a type or category of the events (step 44). For instance, the event classes can include fire events, weather events, parade events, and filming events. The event classes can be organized as a hierarchy, as further described infra with reference to FIG. 16. The event classes can include a set of parameters to indicate what types of analytics should be performed with the event objects, as further described infra with reference to FIG. 15. In a further embodiment, the event objects can be associated with event tags for further classification (step 45). The event tags are labels that describe further information about the events. For instance, for the event object classified as "fire event" class, the event tags, such as "bad weather" or "unplanned event" can be associated. The event tags may also be arranged in a hierarchy. For example, "wild fire" tag may have "fire" tag as a parent in the hierarchy and "fire" tag may have "unplanned" tag as a parent.

Figure 4:
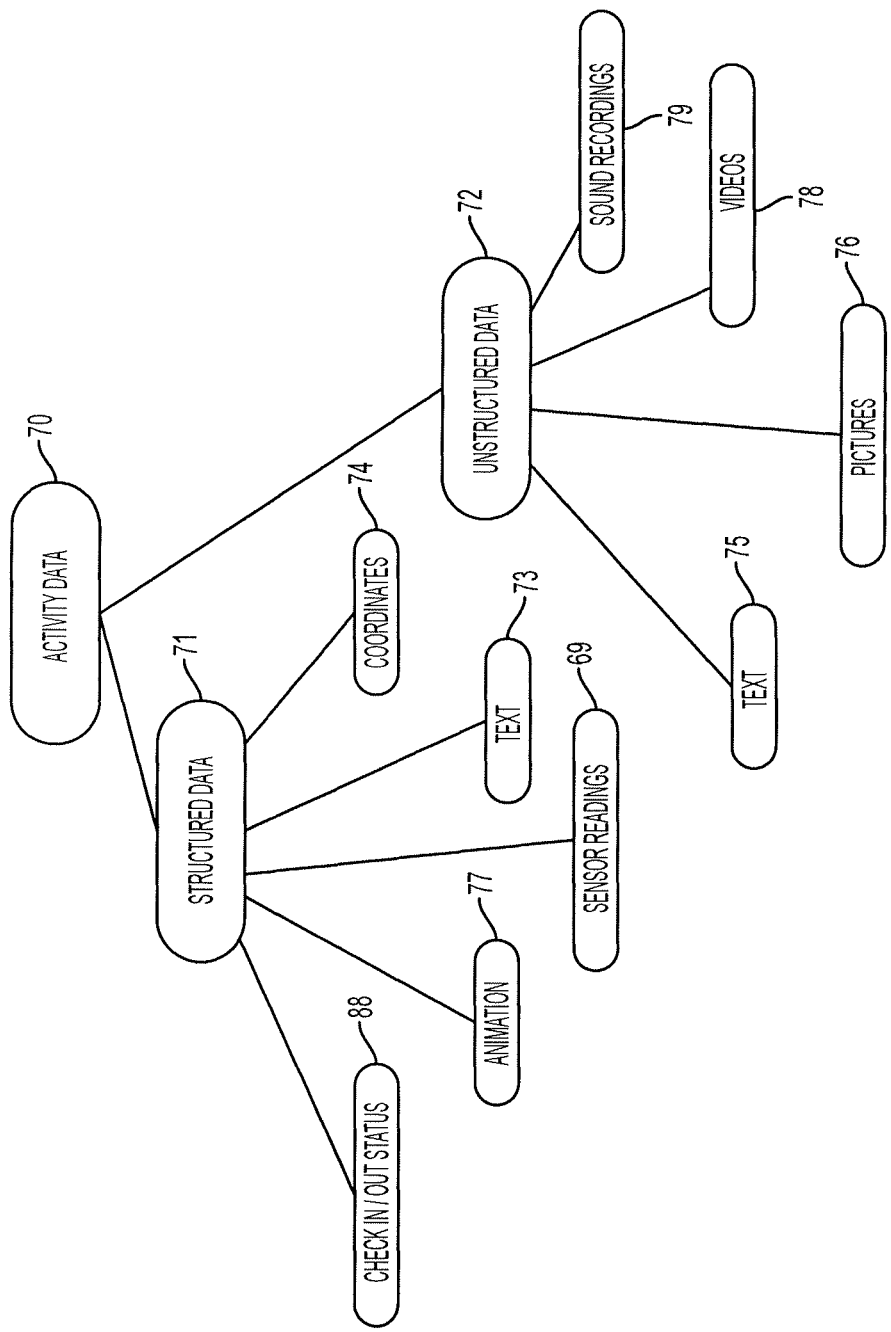
FIG. 4 is a functional block diagram showing examples of activity data for use in the method of FIG. 2.

While the event object is created for the event occurred, activity data regarding the event is continuously collected from actors of the activity and maintained in a database interconnected to the episodic analytics system (step 46). The activity data is typically created through a user interface, such as a Web interface application or mobile dashboard application. FIG. 4 is a functional block diagram showing examples of activity data 70 for use in the method of FIG. 2. The activity data 70 is generally distinguished in two types of data, structured data 71 and unstructured data 72. The structured data 71 can include descriptions of the activities (what) performed by each actor (who) at a certain time (when) at a certain location (where). For example, the structured data 71 can include an identify of a worker, an organizational position or group of the worker, daily assignment records, past performance, time of a fire occurred, location of the fire, work assignment from a supervisor to officers, reports from informants, check-ins and check-outs of workers, and so on. Thus, the structured data 71 can be recognized as data and processed by the system. The structured data can take a form of texts 73, GPS coordinates 74, sensor recordings 69, and check in/out status 88. Other forms of structured data 71 are possible. The structured data 71 can be displayed on a dashboard application as animations 77, as further described infra with reference to FIG. 8.

On the other hand, the unstructured data 72 can provide additional information to the structured data. For example, the unstructured data 72 can include texts 75, pictures 76, video 78, and sound recordings 79 which can supplement the structured data. Other types of unstructured data are possible. As an example, a worker can directly type texts 73, 75 on a dashboard application and also can upload relevant pictures 76, animation 77, videos 78, and sound recordings 79 relating to the activity data. The worker can also continuously send GPS coordinates 74 of where he is until he arrives at an event site, check in status 88 when he starts performing tasks, and sensor readings 69 at the event site.

Preferably, when the worker creates activity data via the user interface, one or more tags can be associated with the activity data (step 47). The association of the tags can be made in various ways, as further described infra with reference to FIG. 6. Whenever an event is recognized and an event object is created for the event, collection and association of activity data with the event object is repeated (step 48).

All the event objects and associated activity data can be used for performing analytics (step 49). Many different kinds of analytics can be performed for the event objects and activity data, including classifying the event objects and activity data, identifying and tracking the event objects and activity data based on the classification, identifying actors of the activity data, calculating numbers of the actors and equipment used, calculating numbers of the same classes of the event objects and activity data, performing statistical analysis to the event objects and activity data, and so on. Other types of analytics are possible. For example, for reviewing a fire event object occurred on May 22, 2014, analytics such as total number of crews assigned to the event, duration of the event, inventory of the equipment used, duration for the crew to arrive at the fire location, duration for a commander of the event to estimate more help, and duration of actual ceasing the fire can be performed. Analytics for the event objects and activity data can be periodically performed or performed on demand, as further described infra with reference to FIG. 15.

Once the analytics are performed, the analytics data can be used for further analysis, such as reviewing and evaluating organizational performance (step 50), planning recurring events (step 51), and performing trend analysis (step 52). Managers and supervisors can evaluate the organizational performance through a review of the analytics data, as further described infra with reference to FIG. 14-25. Further, the analytics data for past events can be used to forecast and plan for recurring events, as further described infra with reference to FIGS. 26-31. In addition, the analytics data can be used for spotting trends in data and discovering anomaly data points, as further described infra with reference to FIGS. 33A-33B.

By the episodic analytics system, all the relevant activity data for an event is organized under the event object inasmuch as the activity data is directly associated with the event objects according to the tags. Further, the activity data, however subjective or objective, from multiple sources can be integrated into a workflow data. By executing analytics on such digitally managed organizational data, performance of organization can be easily evaluated. In addition, planning future events and discovering trends can be far more efficiently processed.

Collecting and organizing event data

Activity data can be mostly created by agents and mobile workers in an organization, such as police officers, fire fighters, transportation enforcement officers, doctors and nurses. The creation of event objects organizes not only information about each particular event from multiple workers in the organization but also other workers in different organizations. An example scenario can help to illustrate.

| Example Scenario 1 | | |
| --- | --- | --- |
| Date/Time | Actor | Activity |
| Friday, May 22, 2014 6:00AM | Fire Alarm | Alarm A smoke detector FD#1 goes off in a cafeteria kitchen in the W Department Store. This triggers a storewide alarm and also sends an alarm message to a fire dispatcher. |
| 6:01AM | Fire Dispatcher Anderson | Event Instance Creation A fire logging system receives the alert message from the alarm. An automatic message includes the time and kitchen location information for the alarm. The episodic analytics system creates a fire event object and fills in the time and location information from the alarm message. The system also assigns a tag "Fire-W-2014.05.22" and alerts the fire dispatcher. |

Upon receiving a message from a fire alarm at the W Department Store, a new fire event object is created. The created fire event object can incorporate information such as time and location of the fire event from the received message. The location can include coordinates or street address of the fire. Further, a title of the event object can be determined based on the information initially included in the message, such as data and location of the fire event. Once the event object is created, an alert can be sent to a fire dispatcher. In a further embodiment, the fire dispatcher can approve or deny the creation of such event object. The event object can accept further information from the fire dispatcher and data from other sources.

Figure 5:
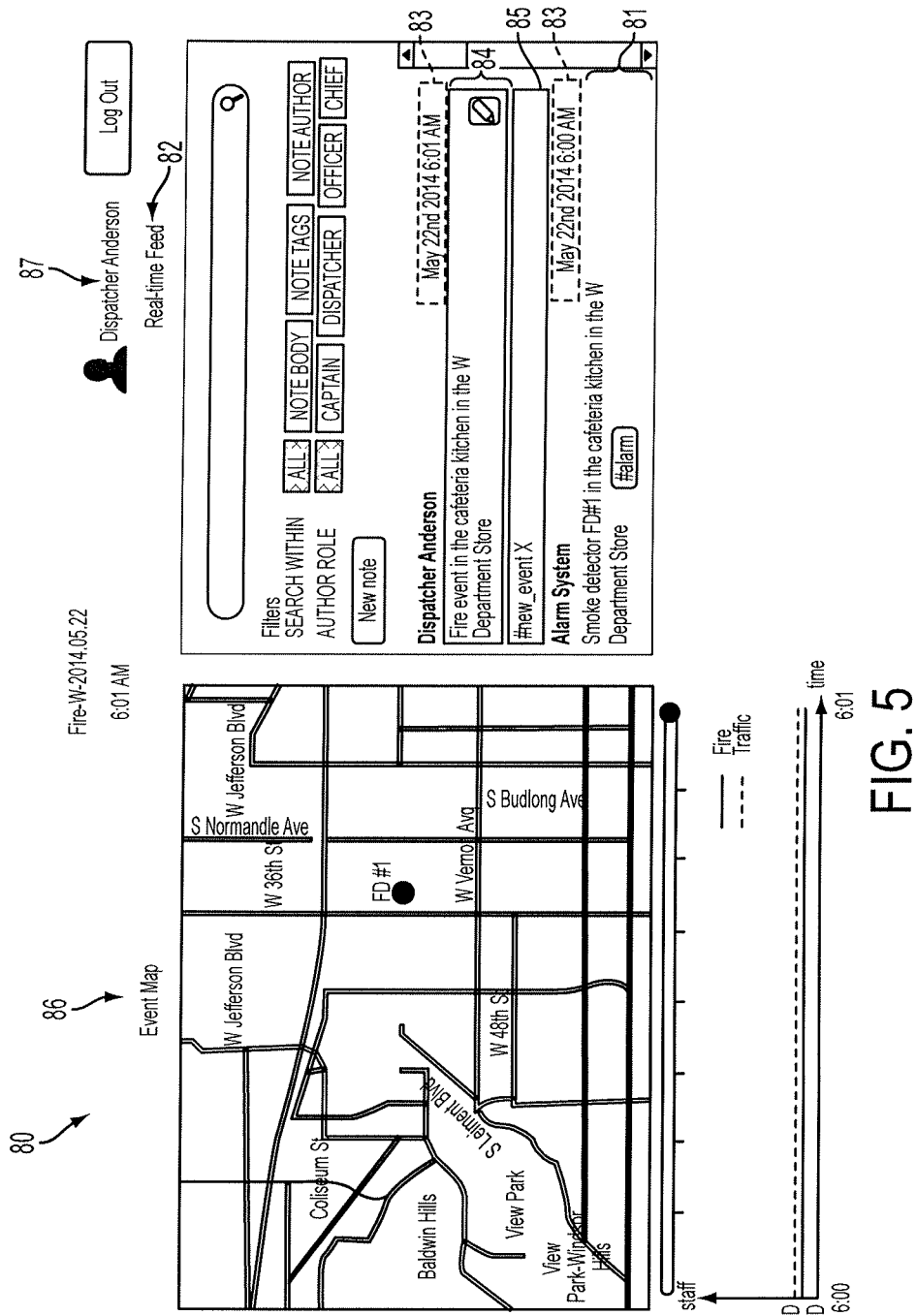
FIG. 5 is a screenshot showing, by way of example, a real-time dashboard for creating activity data for an event.

An on-going event can be properly organized and kept updated through a real-time dashboard. By way of example, FIG. 5 is a screenshot showing a real-time dashboard 80 for creating activity data for an event. In this example, the message from the fire alarm system 81 which triggered creation of the event object is automatically inserted in logs for activity data 82 as "Real-time Feed." In one embodiment, the activity data in the log is chronologically organized based on the time 83 of the activity data is created. In a further embodiment, the logs can be chronologically organized based on the time that the activity data is tagged with event tags. Other ways to indicate the time on the log are possible. Each actor for the event can access to the event object through a user interface. In addition, supervisors and managers can review the event object and the activity data real time. In this example, a fire dispatcher, Anderson, 87 is currently accessing to the event object "Fire-W-2014.05.22" through the user interface on a computer, such as a laptop or desktop computers. Dispatcher Anderson creates activity data 84 regarding the information about the fire incident at W. Department Store on 6:01 am.

Figure 6:
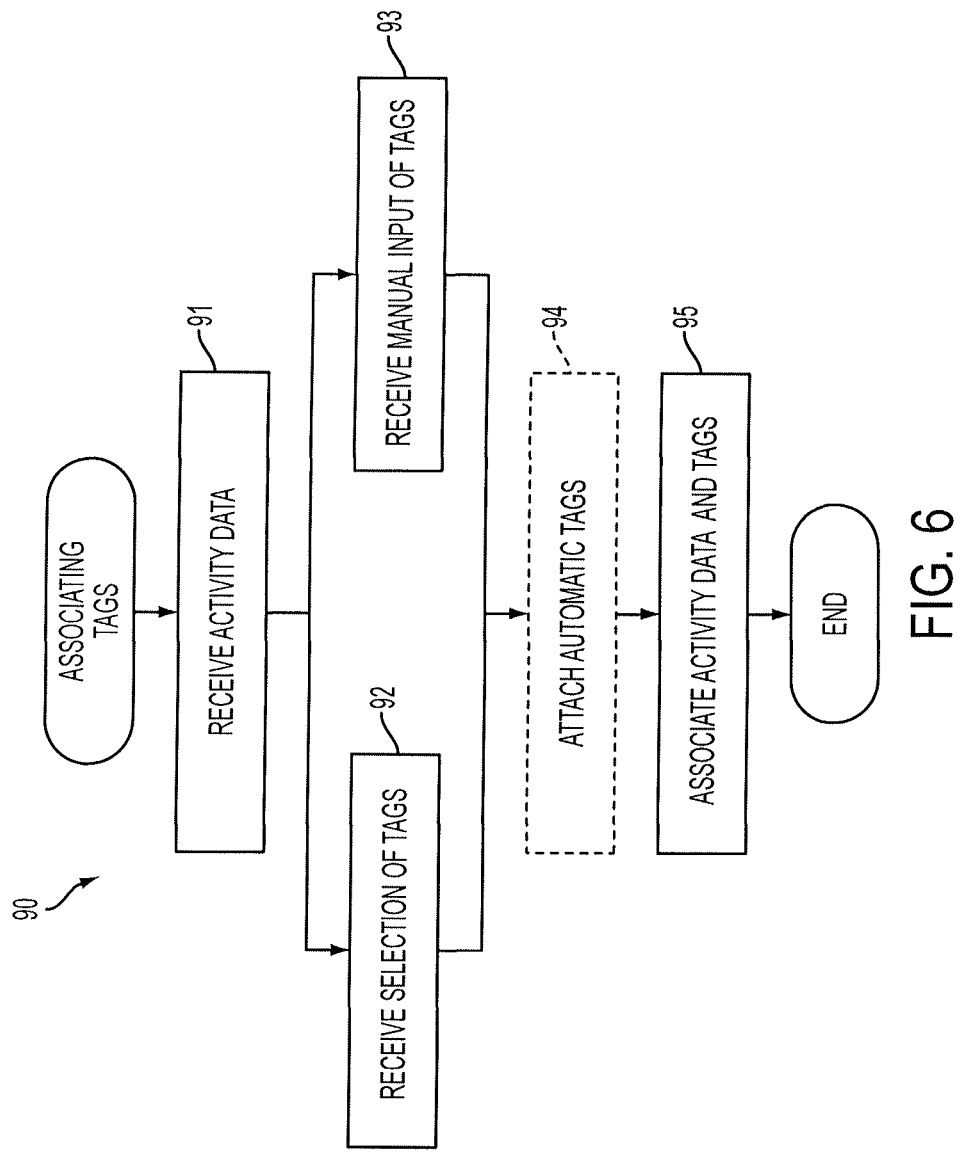
FIG. 6 is a flow diagram showing a routine for associating the activity data with event tags for use in the method of FIG. 2.

The activity data 74 can be associated with a tag 85. FIG. 6 is a flow diagram showing a routine 90 for associating the activity data with tags for use in the method of FIG. 2. Once the activity data is created (step 91), a tag can be specified. Tags can indicate contexts and purposes of the activity data. A creator of the activity data can select tags from a collection of predefined tags (step 92). One or more tags can be selected for a single activity data. The predefined tags can include, for example, "#department store," "#kitchen fire," "#out-of-business hours," and so on. In one embodiment, the creator of the activity data can manually specify a tag in addition to or in lieu of the predefined tags to further characterize the event object (step 93). In a further embodiment, tags can be automatically entered along the activity data is created (step 94). Such automatic tags can include author's identity, location, and time. Other types of automatic tags are possible. In this way, the activity data can be associated with one or more tags (step 95) and help to identify and track the activity data based on the associated tags. Tagging can be done at the time when the event object is created or after the event object is created. Referring back to FIG. 5, Dispatcher Anderson adds a tag 85 "#new_event" tag to his activity data 84.

On the left side of the diagram of FIG. 5, an event map 86 can also be displayed. The event map can specify locations relating to the event dynamically and statically. Dynamic locations of objects on the event map 86 can include movement of fire trucks, ambulances, traffic control officers, and so on. Static location of objects on the event map 86 can include fire detectors, fire stations, police stations, and so on. Other examples of dynamic and static objects are possible. In this example, the event map 86 displays a location of the smoke detector FD #1, which indicates a location of the W Department Store as well.

| Date/Time | Actor | Activity |
|---|---|---|
| Friday, May 22, 2014 6:02AM | Fire Dispatcher Anderson | Mobilizing a Response Dispatcher Anderson looks at a display of other ongoing fire events and team assignments. She decides to mobilize station #1. She calls a Fire Captain Jackson at the Fire Station #1 using a radio or phone. As they talk, she interacts with the episodic analytics system and assigns the event to Station #1. The event object now appears on the dashboard application used by Captain Jackson. The fire event object is forwarded automatically to dispatchers in other city agencies including the 911 dispatcher, the Police Department, and the Department of Transportation. |
| 6:04AM | Fire Station Captain Jackson | Acknowledging and Documenting the Assignment Captain Jackson verbally acknowledges the mobilization on the radio and also on his Web interface application. Captain Jackson arouses a crew of four. The crew goes to a fire engine. |
| 6:06AM | | Crew Documentation As each crew member is added, a "Check-In" message is created and tagged for the event with the crewmember's name or badge number. Fire crews: A. Brown, B. Jones, and C. Smith are checked in. The messages are added to the log for the event. |
| 6:07AM | | Similarly, Captain Jackson enters information about the equipment used in responding to the fire - a fire truck and an ambulance. This is logged as an "Equipment" message. The mobile device connected to the fire truck has a |

-continued

| Date/Time | Actor | Activity |
|---|---|---|
| | | GPS unit that begins periodically recording the location of the fire truck. |

Figure 7A:
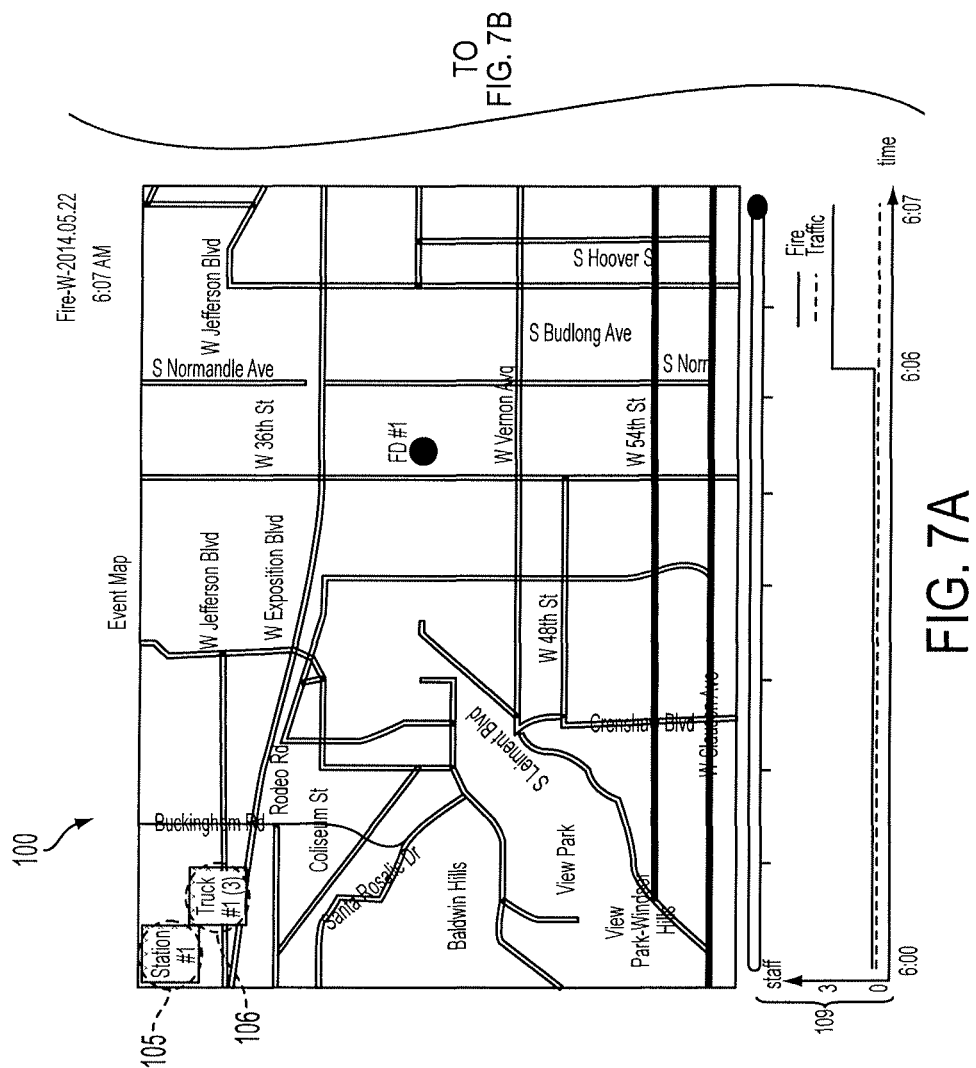
FIGS. 7A-7B are screenshots showing, by way of example, the real-time dashboard displaying a log containing event assignments and an event map indicating locations regarding the event.
Figure 7B:
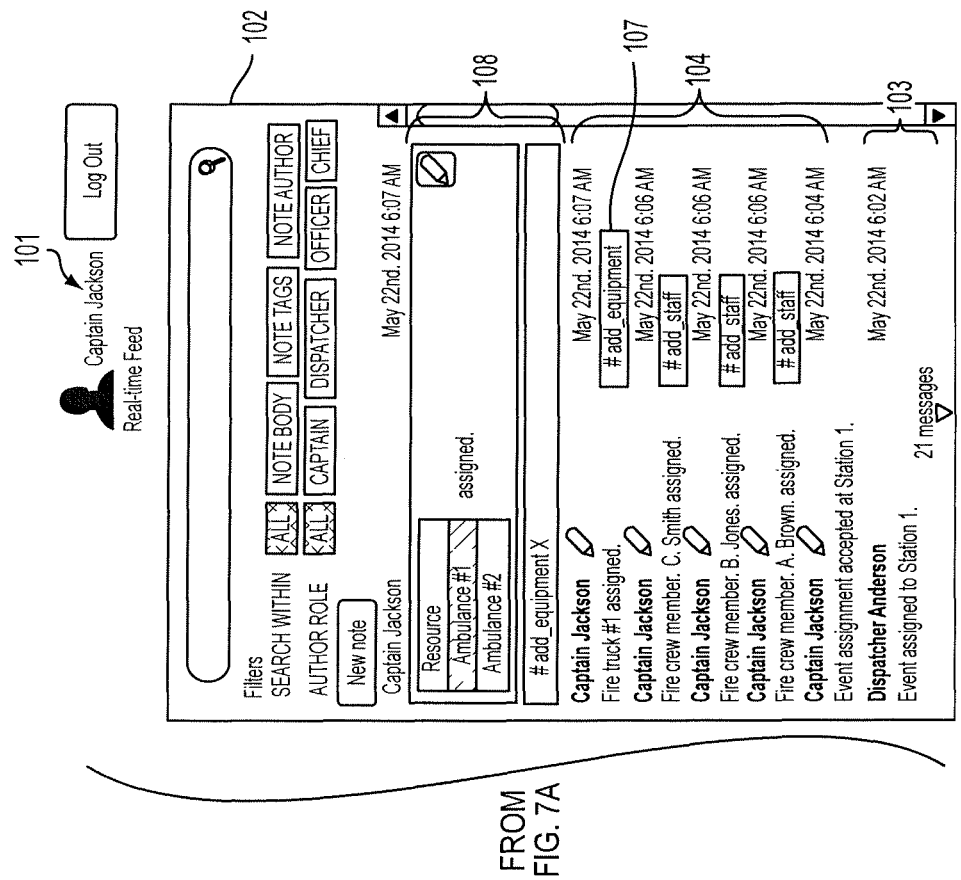

The event objects can be sent to dashboards of a certain group of people who are assigned to work on the event. In the above scenario, the event object is manually assigned to the Station #1, specifically to Captain Jackson who is in charge of the Station #1. By the assignment, Captain Jackson can access to the event object through his real-time dashboard. Similarly, the event object can be automatically transferred to others, such as supervisors and managers of the Fire Department and other city agencies including the 911 dispatcher, the police department, and the transportation department. By way of example, FIGS. 7A-7B are screenshots showing the real-time dashboard 100 displaying a log containing event assignments and an event map indicating locations regarding the event. The real-time dashboard 100 reflects updates on the activity data and displays the updates. The real-time dashboard 100 is currently displayed for Captain Jackson 101. On the log 102, the activity data 103 created by Dispatcher Anderson indicates the assignments of this event to the Station #1. Further, Captain Jackson creates the assignments of crewmembers 104. The event map shows the location 105 of the Station #1 and the location 106 of Truck #1 which three crews are driving. The activity data for assigning a fire truck or ambulance is tagged as "#add.equipment" 107 and the activity data can be tracked and processed for analytics. Further, Captain Jackson can create additional activity data on the real-time dashboard to assign Ambulance #1 to the event 108. A staffing chart 109 can display how much resources are used for the event object by indicating how many workers are currently assigned to the event on real-time and the time axis of the graph can track the transition of staff number variation as the time goes. In this example, the staffing chart 109 indicates addition of three fire crews at 6:04. In a further embodiment, time-oriented data can be displayed on the real-time dashboard as a non-linear time scale. Other displays for time-oriented data are possible.

| Date/Time | Actor | Activity |
|---|---|---|
| Friday, May 22, 2014 6:07AM | Fire Dispatcher Anderson | Fire Site Contact Check Dispatcher Anderson calls a contact at the W Department Store. The contact tells Dispatcher Anderson that the smoke is coming out from the kitchen of the cafeteria in the store. (This confirms the alarm message.) The dispatcher enters this information into a "fire description" note. |
| 6:08AM | Citizen #1 | Citizen Observation A citizen driving by the W Department Store notices smoke coming out a second floor window of the W Department Store and calls 911. |
| 6:08AM | 911 Operator | A 911 operator takes the call and hands the call off to Dispatcher Anderson. |
| 6:09AM | Fire Dispatcher Anderson | Dispatcher Anderson gathers the citizen's observations and creates a note. Dispatcher Anderson tags it as a "citizen description" of a fire. The dispatcher sees that there is an active fire event at the same location and tags a new note with the existing event "Fire-W-2014.05.22". |

Figure 8:
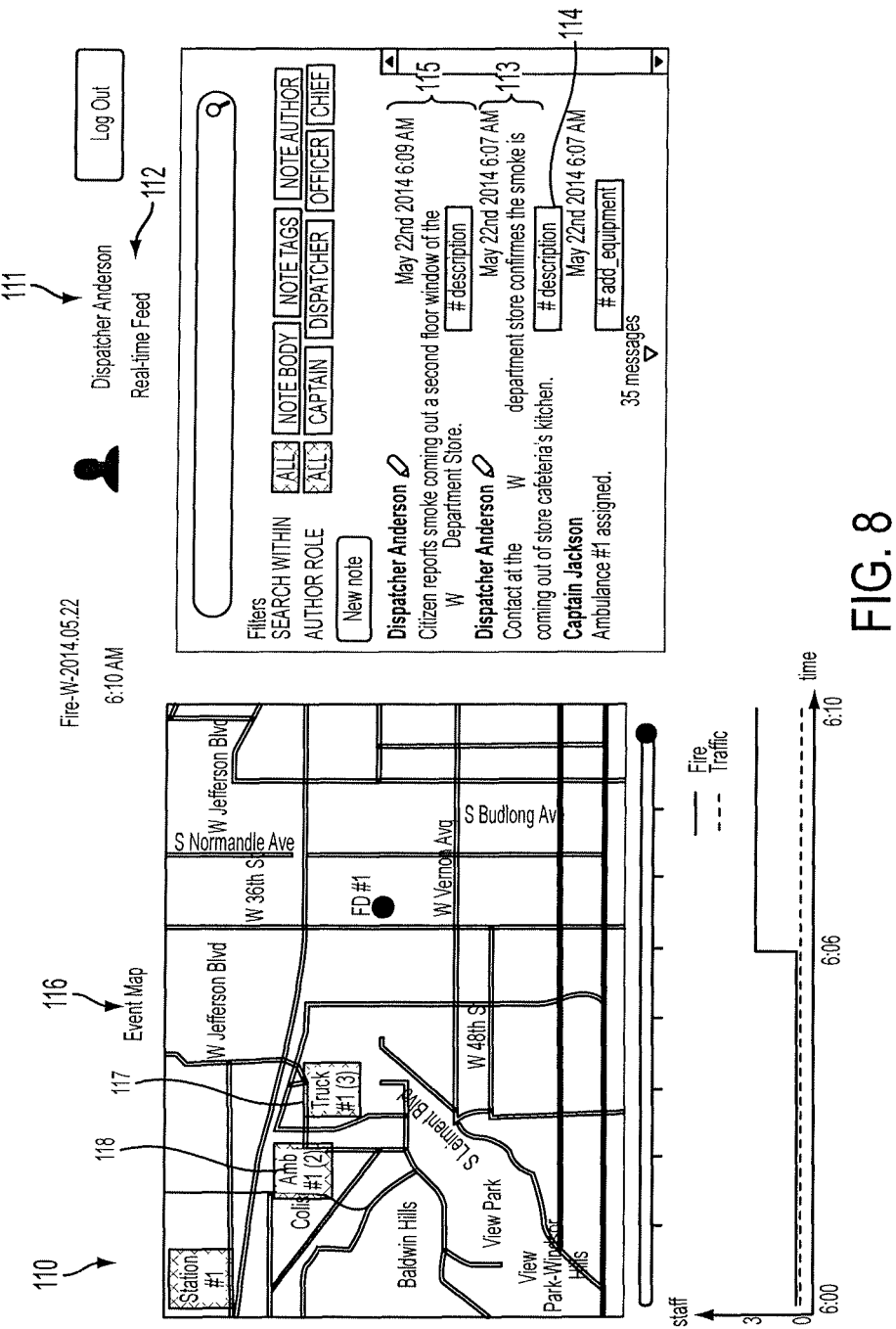
FIG. 8 is a screenshot showing, by way of example, the real-time dashboard displaying real-time changes in location of event actors on the event map and notes from event actors on the log.

The log in the real-time dashboard continues to show activity data added by each event actor so that the event actors can identify on-going situations of the event. By way of example, FIG. 8 is a screenshot showing the real-time dashboard 110 displaying animations of real-time changes in location of event actors on the event map and notes from event actors on the log. The current view is adjusted for Dispatcher Anderson 111. In this scenario, Dispatcher Anderson 111 adds a note 113 on the log 112 regarding the information he obtained from the conversation with the contact at the W Department Store and tags the activity data with "#description" tag 114. Dispatcher Anderson further adds a note 115 to the log 112 regarding the information from a citizen, which was forwarded from a 911 operator. Further, on the event map 116, a truck icon 117 which contains three fire crews on a Truck #1 and an ambulance icon 118 which contains two paramedics on an Ambulance #1 are moving on the event map 116 as animations and indicates the current location of the Truck #1 and Ambulance #1 while they are travelling from the Station #1 to the W department store to respond to the fire.

| Date/Time | Actor | Activity |
|---|---|---|
| Friday, May 22, 2014 6:09AM | Traffic Control Dispatcher Jameson | Traffic Control Mobilization Dispatcher Jameson sees the fire event on his dashboard and begins to mobilize a traffic control response. She acknowledges the event, locates two nearby officers, and asks them to accept the special assignments to direct traffic around the fire. |
| 6:10AM | Traffic Officer Green | Accepting Assignment Traffic Officer Green receives a note on his mobile device from Dispatcher Jameson assigning him to a fire duty. Using the device, he clicks on "accept assignment" to acknowledge the special assignment and drives to the fire location to begin putting out traffic cones and re-directing traffic. His mobile device sends or records periodic GPS coordinates of his position. |
| 6:10AM | Traffic Officer Rogers | Declining Assignment Officer Rogers is busy directing traffic around an accident. He clicks "decline assignment" indicating that he is unable to accept the fire special assignment. |
| 6:12AM | Traffic Dispatcher Jameson | Dispatcher Jameson notes that Traffic Officer Rogers declined the assignment and requests Officer Williams to handle the traffic control around the fire event. |
| 6:13AM | Traffic Officer Green | Traffic Control Arrival Officer Green arrives on the scene. He sends a GPS message with an #arrival.at.event tag. |
| 6:13AM | Traffic Officer Williams | Officer Williams accepts the assignment. |
| 6:15AM | Fire Station Captain Jackson | Fire Crew Arrival The Fire Truck #1 arrives on the scene. Captain Jackson assumes the role of Incident Commander. He sends a GPS message with an #arrival.at.event tag. |
| 6:15AM | Fire Crew Smith, Brown, and Jones | The fire crews begin working its checklist. Crewmember Smith finds a water connection for the fire engine. Crewmember Brown makes sure that gas is shut off for the building. Two crews (Brown & Jones) begin searching the Department Store to make sure that the building is completely evacuated. Crewmember Smith stays as a backup and logs the beginning of the search. |

Figure 9B:
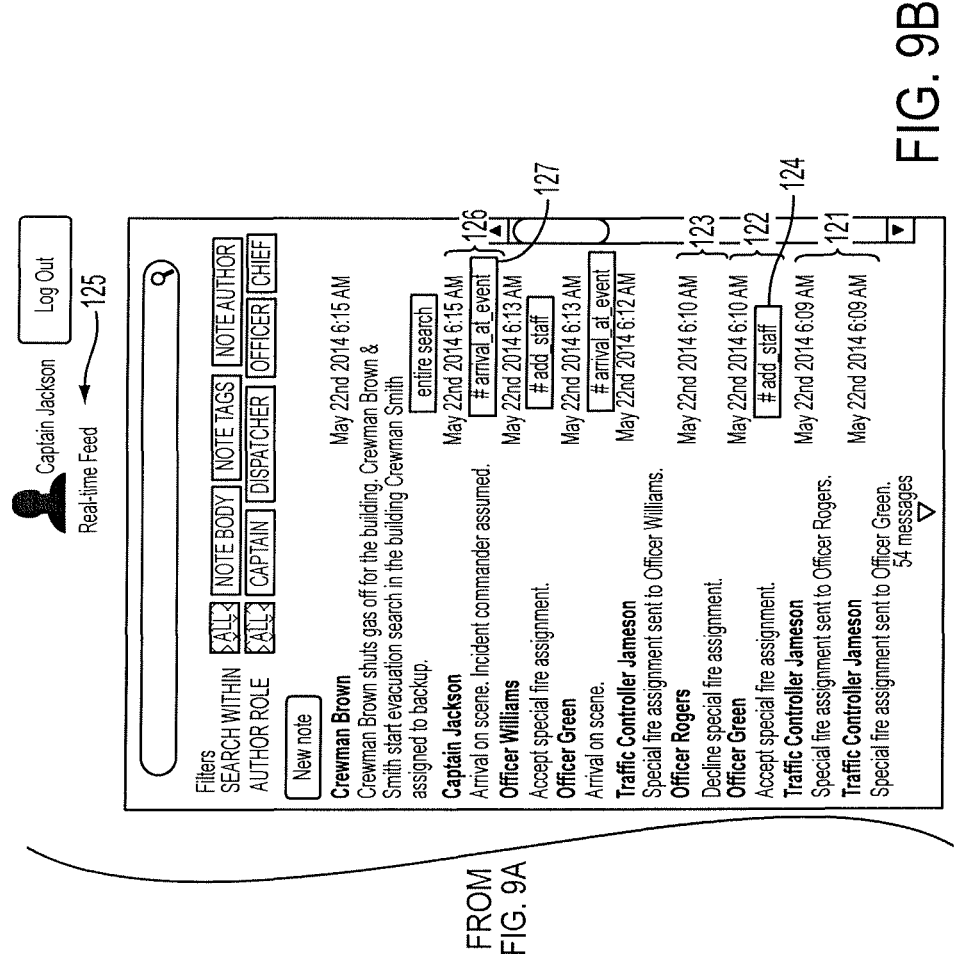

Assignments for an event can be accepted and declined by each actor based on their current work schedule. By way of example, FIGS. 9A-9B are screenshots showing the real-time dashboard 120 displaying arrival of the Truck #1 and Ambulance #1, and traffic control by traffic officers on both the event map and the log. In this scenario, Dispatcher Jameson creates the assignments for the traffic control officers 121 and each traffic control officer responds to the assignment 121 by accepting 122 or declining 123. Once the assignment is accepted 122, the activity data is tagged with an "#add_staff" tag 124. The log 125 displays arrival of the fire crewmembers on the site 126 by Captain Jackson with a tag of "#arrival_at_event" 127. Concurrently, the event map 128 displays the location of truck icon 129 for the Truck #1 and the ambulance icon 130 for the Ambulance #1. The traffic control has been established as a circular perimeter 131 by two traffic control officers. In a further embodiment, the traffic control can be displayed as a perimeter of a block or two or actual streets where traffic is diverted. Other ways to display an area of traffic control are possible. If evacuation associated with the fire event is necessary, regions for evacuation and the status of evacuation, such as whether the evacuation for a building is checked or completed, can be displayed on the real-time dashboard 120. Data merged from other sources, such as traffic speed near the fire event or citizen reports about detours and redirection of the traffic can be displayed on the real-time dashboard 120. Other types of information can be displayed.

| Date/Time | Actor | Activity |
|---|---|---|
| Friday, May 22, 2014 6:40AM | Incident Commander (Fire Captain Jackson) | Requesting Additional Support Incident Commander Jackson determines that the fire is spreading quickly and that more fire support is needed. He uses a note tagged with a tag "#request.help." He requests two more fire trucks to Dispatcher Anderson. He also takes a photo of the evolving situation. |
| 6:45AM | Fire Dispatcher Anderson | Mobilizing More Help Dispatcher Anderson checks the readiness of other fire crews. She assigns the fire event to crews at the Fire Station #4 and Fire Station #5. The Captain at station #4 is also a Fire Chief. |
| 6:46AM | Fire Chief Miller | Mobilizing Crew station #4 Chief Miller mobilizes the Station #4 with crews of five people. They check in and head for the fire location. Following the standard procedure, Chief Miller also mobilizes two ambulances from the Fire Station # 4 to go to the fire location. |
| 6:46AM | Fire Captain Davis | Mobilizing Crew Station #5 Captain Davis mobilizes the Station #5 for crews of three people. They board a fire engine, check in, and head for the fire location. |
| 6:50AM | Fire Chief Miller | Arrival of Crew Station #4 The crews from Station #4 arrive at the scene. Chief Miller confers with Captain Jackson. Following the protocol, Chief Miller assumes the role of Incident Commander. |
| 6:54AM | Fire Captain Davis | Taking Pictures of Fire Captain Davis takes some photos of the fire in his notes about the response of the team. (These are automatically tagged and associated with the fire event.) |
| 6:55AM | Traffic Control Dispatcher Jameson | Requesting More Traffic Control Dispatcher Jameson sees the escalating number of fire crews arriving at the incident. She checks with Officer Green at the scene and confirms that more traffic control support is needed to direct traffic away from the blocks affected by the fire. She requests four more officers to join support for the event. She calls Traffic Supervisor Sue to further monitor the scene in person. |

-continued

| Date/Time | Actor | Activity |
|---|---|---|
| 7:00AM | Traffic Supervisor Sue | Adding Traffic Supervisor Supervisor Sue agrees to supervise the traffic control for the fire and checks in to the fire event using her mobile device. |

Figure 10A:
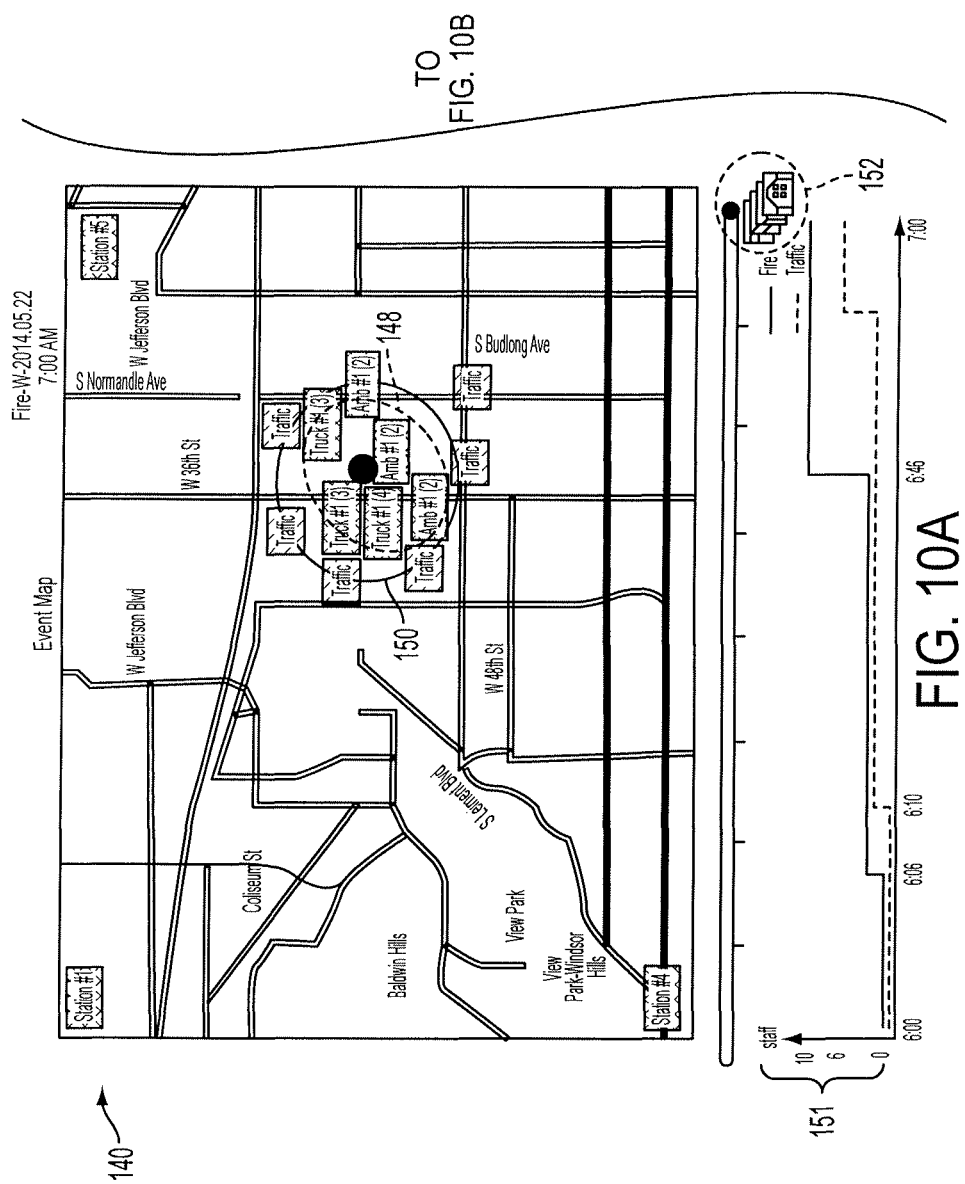
FIGS. 10A-10B are screenshots showing, by way of example, the real-time dashboard displaying activity data for requesting help and responses to the request on both the event map and the log.
Figure 10B:
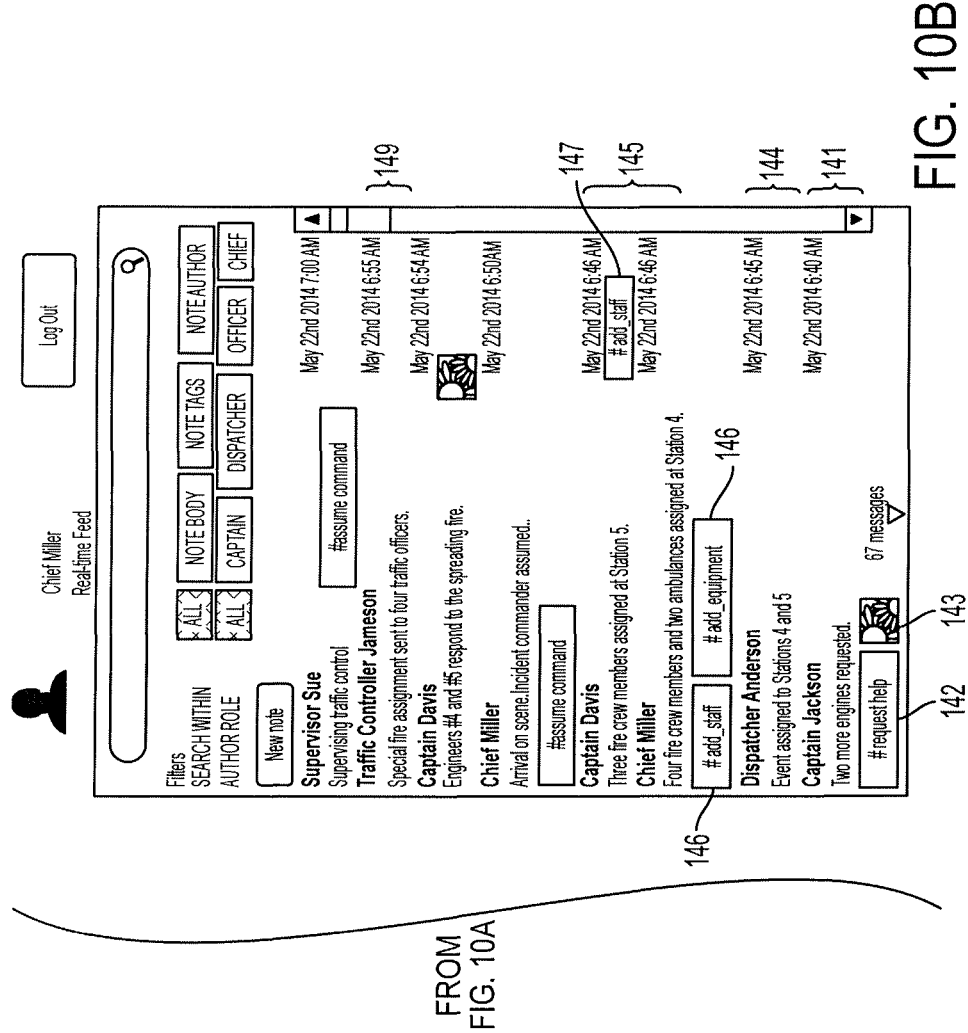

Through the real-time dashboard, each actor can efficiently and rapidly communicate with others for further needs. By way of example, FIGS. 10A-10B are screenshots showing the real-time dashboard 140 displaying activity data for requesting help and responses to the request on both the event map and the log. In this scenario, Captain Jackson creates activity data 141 for requesting further assistance with a tag "#request_help" 142. Further, the activity data 141 attaches with pictures 143 for explaining the current fire situation at the W Department Store. The activity data 141 triggers Dispatcher Anderson to assign 144 this event to two other fire stations, Station #4 and Station #5. Activity data 145 for assigning more fire trucks and ambulances through supervisors for each fire station from Chief Miller and Captain Davis can be displayed on the real-time feed. Once the assignments to the Station #4 and #5 are accepted, the location data and the status of each fire truck and ambulance can be tracked and each activity data 145 is associated with tags 146, 147 such as "#add_staff" and "add_equipment." The event map 148 now indicates Truck #4, Truck #5, Ambulance #4, and Ambulance #5 in addition to Truck #1 and Ambulance #1. The activity date regarding arrival of additional fire crews to the W Department Store triggers Dispatcher Jameson to request further traffic control help 149. The added traffic control helps are displayed on the event map with more traffic control officers 150. The real-time dashboard 140 can also display transitions of crewmember assignment in the staffing chart 151 so that the transitions can be chronologically displayed in the chart. In a further embodiment, on the real-time dashboard, thumbnails of pictures of the fire activity 152 can be included. In this example, the thumbnails are displayed on the time axis in the event map. Further, the picture icon 143 can be displayed in the log as well.

Figure 11:
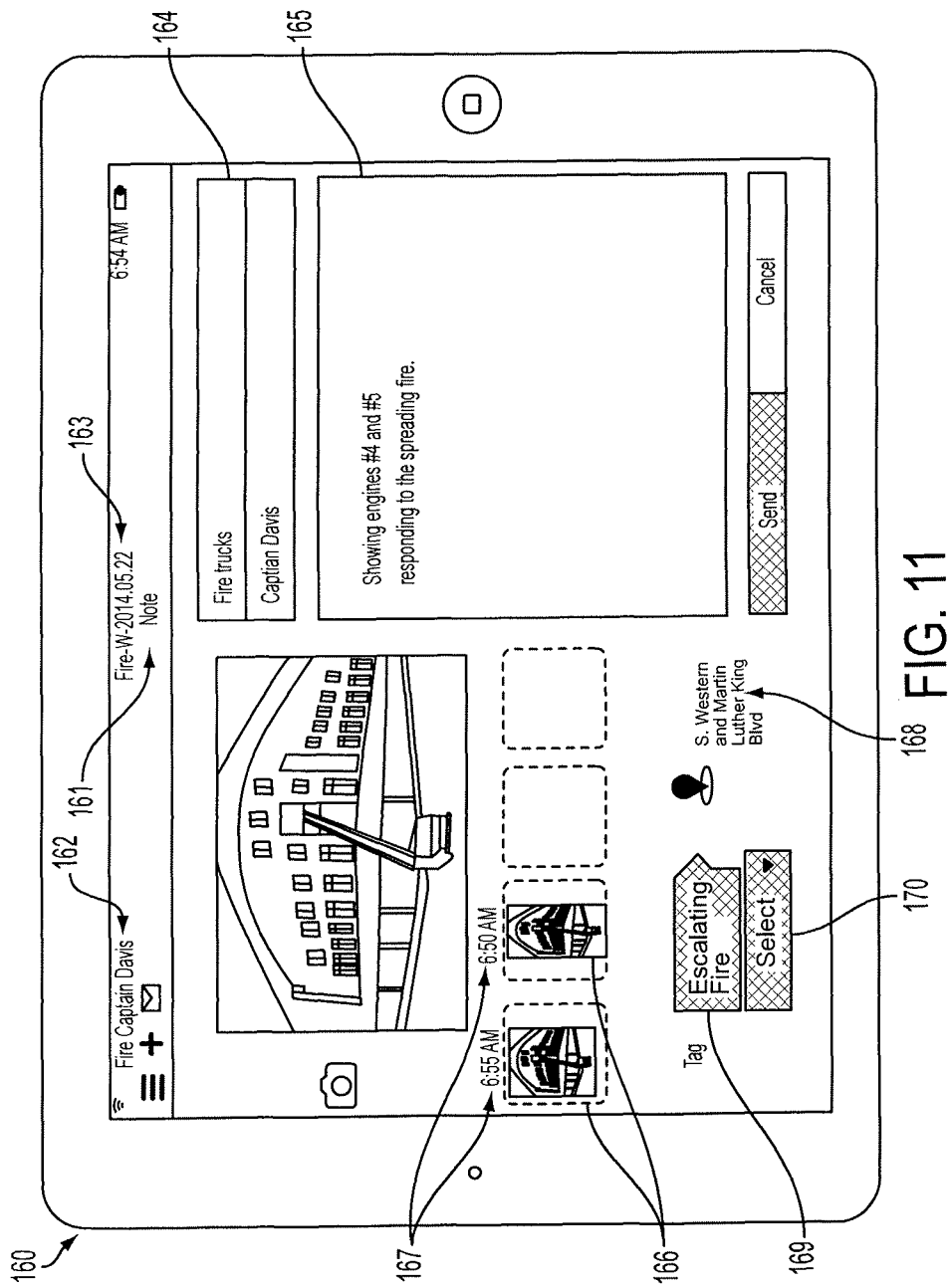
FIG. 11 is a diagram showing, by way of example, a mobile interface for creating a note.

A note as activity data can be created through a graphical user interface on a personal computer or mobile device. A note can convey details of the activity, including structured data and unstructured data. By way of example, FIG. 11 is a diagram 160 showing a mobile interface for creating a note. A note 161 is created by Fire Captain Davis 162 in relation to his duty to assign fire crewmembers from Station #5 and supervises his crews in the fire event. In this example, the note 161 is created for the event object identified as "Fire-W-2014.05.22," thus the note 161 has a title 163 as "Fire-W-2014.05.22." A note is generally processed as data based on tags and does not need to direct to a particular person. In another embodiment, the note 161 can be directed to a specific person, such as a supervisor or manager who reviews his duty report, or even another officer. Such a note can include a subjective observation of the creator, such as described in commonly-assigned U.S. patent Ser. No. 10/013,459, issued Jul. 3, 2018, the disclosure of which is incorporated by reference. Other kinds of persons to direct notes 161 are possible. The note 161 can include a further title 164 to describe a purpose of the note 161 and a field 165 for a user to enter written information for describing further details of the note 161. Further, pictures 166 can be uploaded to the note 161 as a record. The note 161 can indicate times 167 of each picture 166 was taken and include a location 168 of the event object. Finally, the note 161 can include a tag 169, such as "Escalating fire" and other tags, which can be selected from a pull-down icon 170. Other formats of the real-time dashboard for creating notes are possible.

| Date/Time | Actor | Activity |
|---|---|---|
| (Time passes) | All | Fire and Traffic Operations The episodic analytics system continues to log the activities of the teams responding to the fire to the event object. By noon, the fire is out. The building is locked up and guards are in place. The traffic control removes barriers and the traffic in the neighborhood can flow again. The crewmembers for the fire departments "check out" from the event and go on to their next duties. |
| 11:00AM | Incident Commander (Fire Chief Miller) | The Incident Commander declares the fire out and sends a message tagged with "#fire.out." He dismisses the crews after they close out the fire. He takes a photo of the building for showing the fire is out. |
| 11:15AM | Traffic Supervisor Sue | Supervisor Sue dismisses Traffic Officers Green and Williams for lunch as the traffic control is winding down. |
| 1:15PM | Traffic Officers Green & Williams | Traffic Officers Green and Williams return from lunch. |
| 2:00PM | Fire Inspector Lee | Inspector Lee comes to the Department Store. He investigates the fire and takes notes and photos. He notes that the fire spread from the kitchen to the nearby furniture department. He includes photos of the burned out furniture department. |
| 4:00PM | Fire Inspector Lee | After examining the kitchen and adjoining rooms, Inspector Lee writes a note describing the causes of the fire. |

Figure 12:
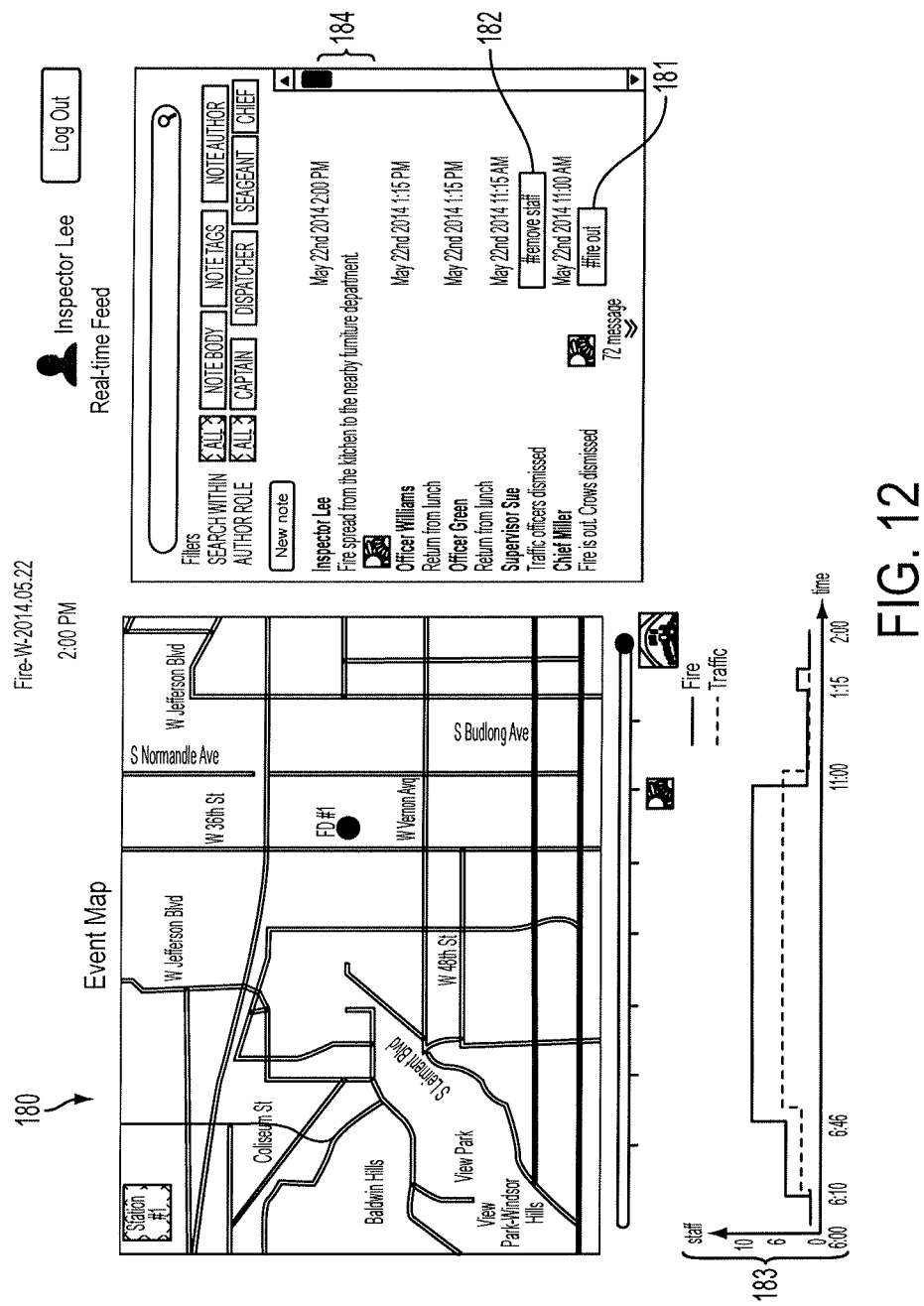
FIG. 12 is a screenshot showing, by way of example, the real-time dashboard displaying completion of the fire event.

The log on the real-time dashboard can continue adding activity data from other actors in relation with the fire event. By way of example, FIG. 12 is a screenshot showing the real-time dashboard 180 displaying completion of the fire event. Once the fire is ceased, the Incident Commander, Fire Chief Miller, can create activity data with a tag of "#fire_out" 181. In response to that activity data, Supervisor Sue for traffic control can add a note of her officer dismissal with a tag of "#remove_staff" 182. Concurrently, the staffing chart 183 shows a decrease of crewmembers from the event after the fire is out. The last note 184 on the log is created by Inspector Lee who writes a report regarding the fire incident at the W Department Store.

Figure 13:
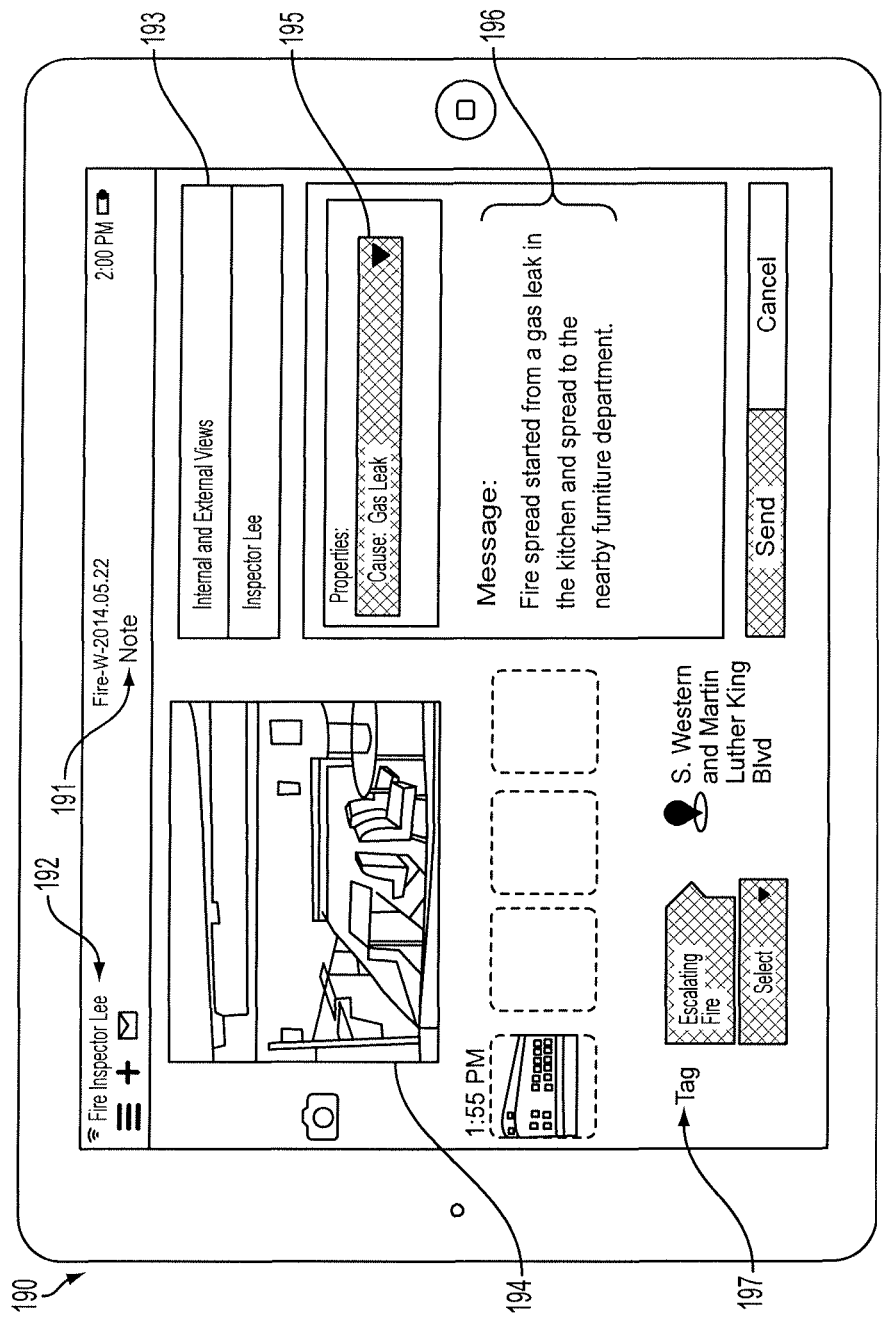
FIG. 13 is a diagram showing, by way of example, a mobile interface for creating a note regarding fire inspection.

The activity data can be added as a note, pictures, GPS coordinates, and so on by other actors. By way of example, FIG. 13 is a diagram showing a mobile interface 190 for creating a note regarding fire inspection. Fire Inspector Lee 192 creates a note 191 regarding the fire event "Fire-W-2014.05.22." The note 191 can contain a title 193 and pictures from the inside of the W Department Store 194 taken by Inspector Lee. The note 191 can contain a fire cause 195 determined by Inspector Lee, which can be selected from predefined categories or manually entered by Inspector Lee, and further comments 196 from him. A tag "fire inspection" 197 is contained in the note 191 so that this note 191 is identified as a fire inspection report. Other types of information can be added as activity data for the event object.

Reviewing Event Data

Each event object can be reviewed by any reviewer on real-time but can be reviewed in detail by a reviewer, such as a supervisor or manager, once the event is completed. For reviewing events, the reviewer can search and access to a specific event object or search and obtain a list of events which meet search filters that are specified by the reviewer on a search dashboard. The filters can be specified based on event classes. The event classes can have categories of classes, which was discussed supra with reference to FIG. 2. The events obtained according to the filters can be displayed on the search dashboard. An example scenario can help to illustrate.

| Example Scenario 2 | | |
|---|---|---|
| Date/Time | Actor | Activity |
| May 29, 2014 | Fire Chief Miller | Chief Miller carries out a routine review of the fire department's performance at the W Department Store fire a week after the fire. He meets with Captain Jackson and Fire Inspector Lee. Using an event review dashboard, Chief Miller calls up recent fire events sorted by date. |

Figure 14:
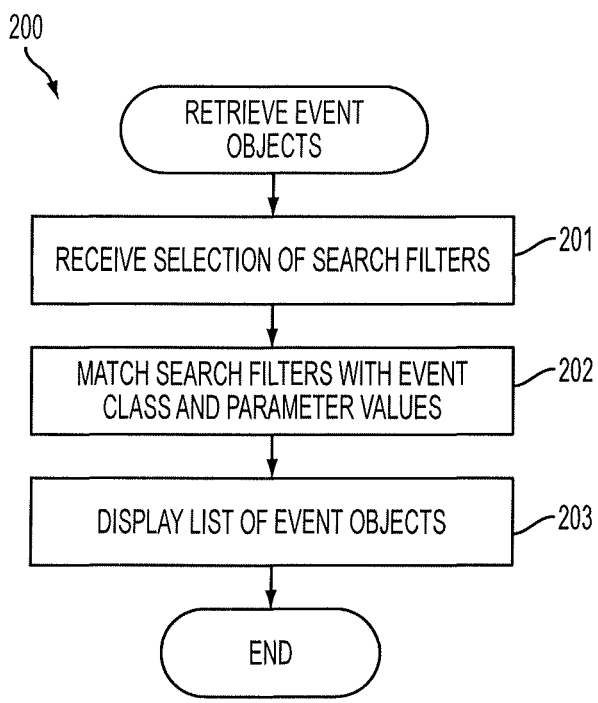
FIG. 14 is a flow diagram showing a routine for retrieving a list of event objects based on filters for use in the method of FIG. 2.

Each event object is assigned with event classes when the event object is created. By using the event class, the event object can be easily retrieved from the database. FIG. 14 is a flow diagram showing a routine 200 for retrieving a list of event objects based on search filters.

Figure 15:
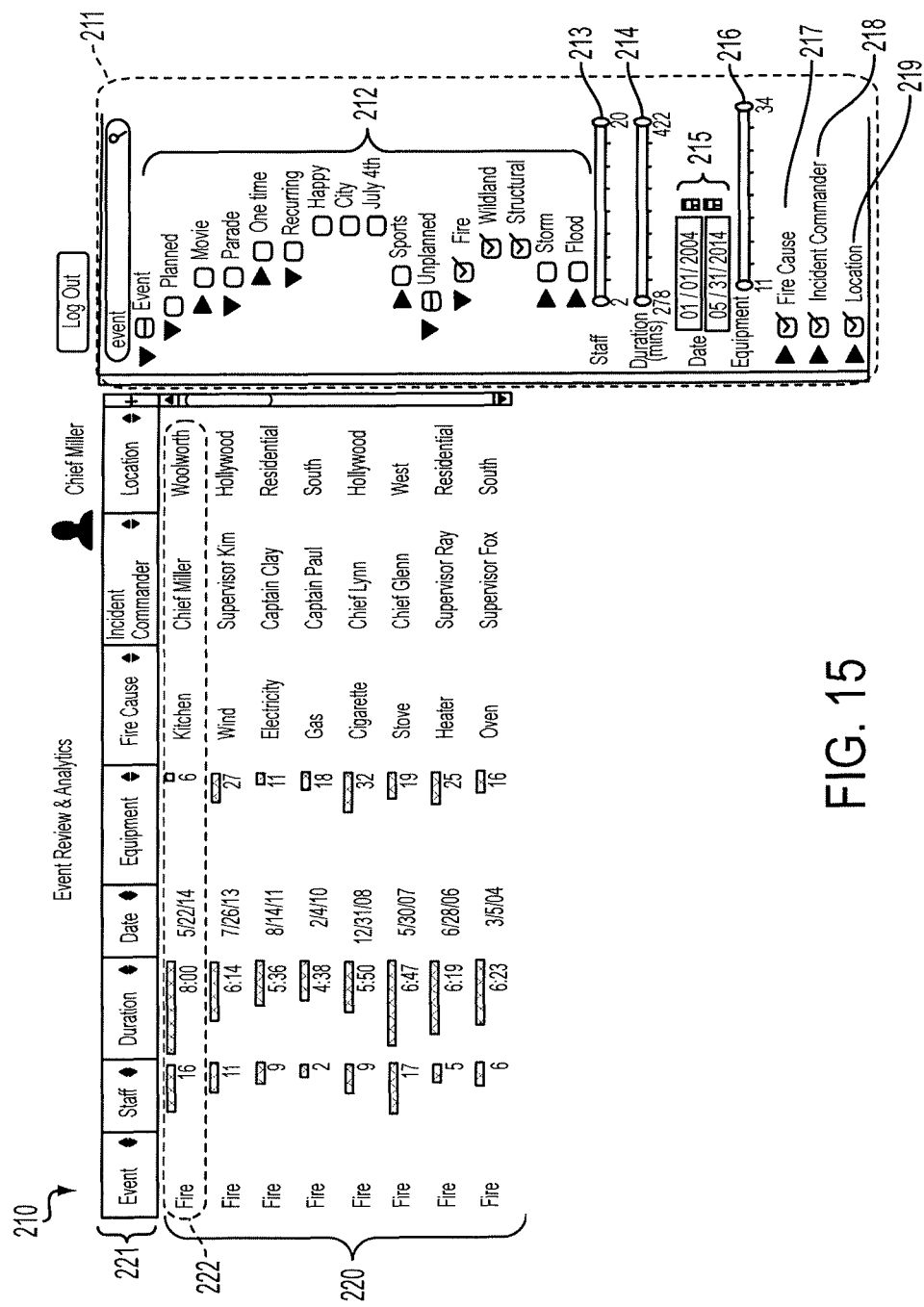
FIG. 15 is a screenshot showing, by way of example, a search dashboard displaying a list of recent event objects obtained through a search.
Figure 16:
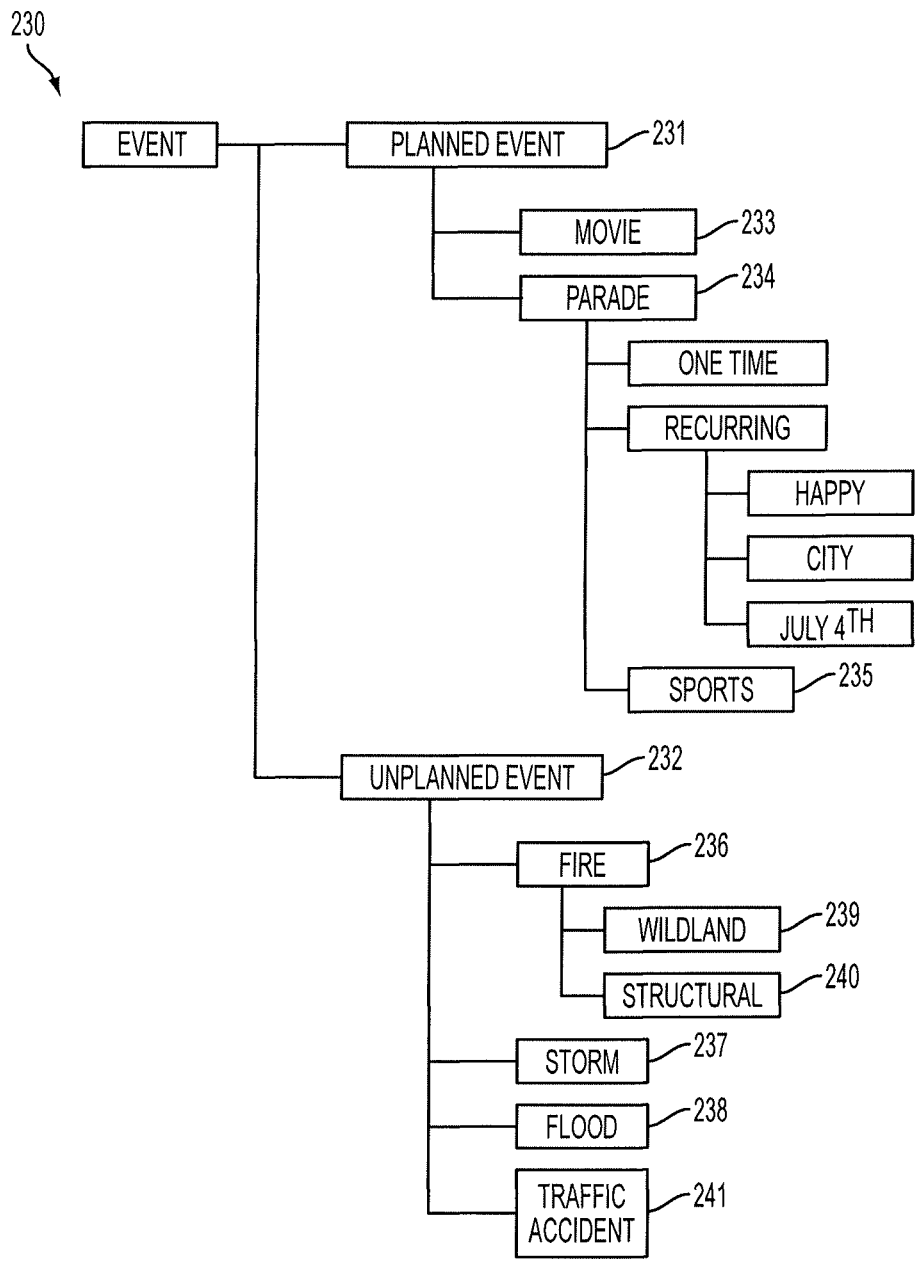
FIG. 16 is a functional block diagram showing, by way of example, an example of event classes organized in hierarchy.

By way of example, FIG. 15 is a screenshot showing a search dashboard 210 displaying a list of recent event objects obtained through a search. On the search dashboard 210, a set of search filters 211 for search can be specified. The filters enable to narrow the list of events to display on the search dashboard 210. The filters 211 can include classes of event objects 212, a number of assigned staff members 213, duration of the event 214, date of events 215, a number of equipment 216, fire cause 217, incident commander 218, location of the events 219, and so on. The event classes 212 can be organized hierarchically. Further, by way of example, FIG. 16 is a functional block diagram showing an example of event classes organized in a hierarchy 230. The event objects can be first classified as "planned event" 231 and "unplanned event" 232. As a planned event 231, the event class can include "movie" 233, "parade" 234, and "sports" 235. As an unplanned event 232, "fire" 236, "storm" 237, "flood" 238, "traffic accident" 241 can be included. Other examples of planned and unplanned events are possible. "Fire" event 236 can be further classified into "wild land" 239 and "structural" 240. Referring back to FIG. 15, the search filters 211 can be parameters 221 for event classes. The parameters are typically specified for each event class and define what types of analytics are performed for the event class. Thus, the parameters should include the entire analytics specific to the event class. Once analytics are performed for the activity data, the parameters can obtain parameter values. The parameter values are typically numerical, such as staff numbers, duration of the event, numbers of equipment used, and so on. In one embodiment, the search filters can include linear combination of parameter values and other more general constraint expressions that describe allowed values. The event classes can be organized as directed graphs, list of lists as well as other forms of ontologies. On the other hand, other numerical data for each event object can be identified through tags associated with the event activity. For the example of FIGS. 10A-10B, the numbers of fire crews and fire trucks added to respond to the fire event can be tracked based on the tags "#add_staff" and "#add_equipment." Other tracking methods for activity data are possible. Referring back to FIG. 14, a selection of filters is received from a reviewer (step 201).

Once a selection of filters is made, then each search filter is matched with event classes, parameters for the event class, and parameter values specified (step 202). Either event class, parameter, or parameter values matches with at least one of the search filters, a list of event objects, which match with the search filter selection, can be displayed as a list (step 203). Referring back to FIG. 15, the fire events for last ten years are displayed on the search dashboard sorted by date. The list of the fire incidents in last ten years can be summarized according to the parameters 221. In this example, the parameters 221 are specific to "fire" event. The parameters for performing analytics for "fire" events can be explained as follows:

| Parameter | Meaning | How Computed | Notes |
|---|---|---|---|
| Staff | Total number of people assigned to the event | Count staff assignments from the messages in the log tagged with "#add_staff." | Variations would distinguish between different kinds of staff such as fire officers, traffic officers, and police officers. |
| Duration | How long was the event | The time difference between the first message in the log and the last message. | Variations include having explicit tags for the beginning and end of the event in order to control whether certain activities (like fire inspection) are included and also to allow for events that are planned ahead (created) but not started until later. Other variations would show start and end times, etc. |
| Time and Date | When the event occurred. | In this example, the time and date of the event is taken from the message tagged with "#new_event." | Variations are similar to the duration parameter where tags for the beginning and end of the event would be useful. The time and date could also be beginning and end times to cover cases when an event runs over multiple days. |
| Equipment | Inventory of equipment used. | In this example, the equipment used is determined from the log messages tagged with "#add_equipment." | In variations, the messages could have explicit parameters to distinguish and report on different types of equipment. |

-continued

| Parameter | Meaning | How Computed | Notes |
|---|---|---|---|
| Fire Cause | What caused the fire? | In this example, the cause of the fire is found in the notes tagged with "#fire_inspection." | There are many functionally equivalent ways of encoding this information in a message stream. For example, there could be a message tagged "#fire_cause" whose content is processed to extract the cause. |
| Incident Commander | Who was in charge of the fire crew at the scene? | In this example, Captain Jackson was initially the Incident Commander and then later Fire Chief Miller assumed that position. This information is determined from processing messages with "#assume_command." | |
| Location | Where was the event? | In this example, the location of the fire is derived from the GPS coordinates of each note or message. | In variations, distinguishing a main point location for the event from the area where people worked is useful. This could be done by having a message tagged with "#event_location" sent by one of the participants and also by creating a bounding box or other shape that contains the positions of staff on the event when they were working on the event. |
| Response Time | How long did it take the crew to arrive at the fire? | In this example, this can be computed from the message log as the time between the start of the event and the messages tagged with "#arrival_at_event" tags. | In variations, the system could distinguish reporting of arrival on the scene by traffic crew and fire crew. |
| Request Help Time | How long took for the Incident Commander to determine that he needed more help? | In this example, this can be computed from the difference in timing between crew arriving at the event ("#.arrival_at_event" tag) and a request for more help ("#request_help" tag). | Variations could include noticing whether help was requested several times and what kinds of equipment and crew were added each time. |
| Fire extinguish Time | How long did it take to put the fire out? | This can be computed by the time difference between the beginning of the event and the sending of a message tagged #fire_out. | |

Figure 17:
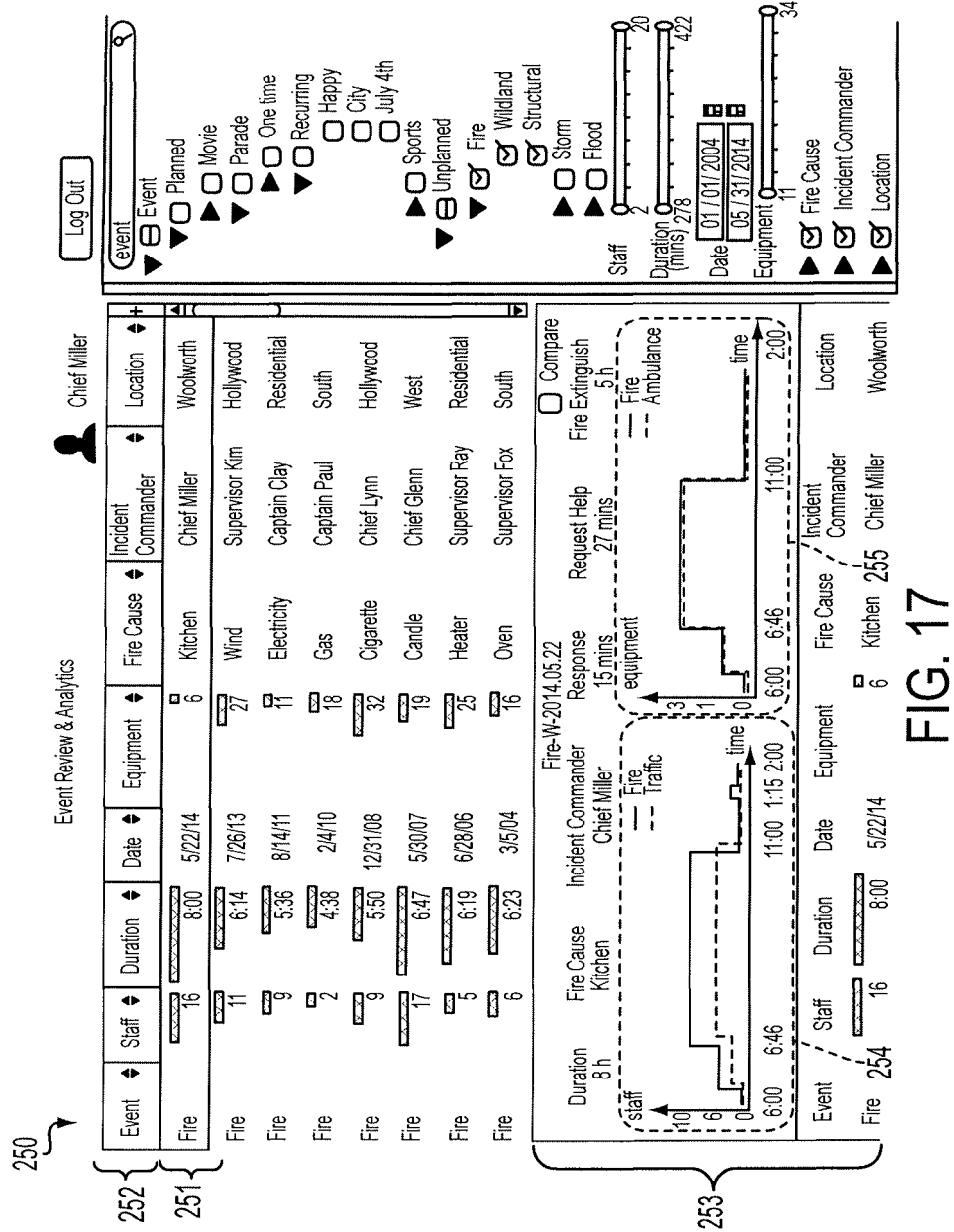
FIG. 17 is a screenshot showing, by way of example, the search dashboard displaying further details of the selected fire event.

By providing a summary of each event incident based on parameters, the reviewer can quickly understand about each event with the analytics. Referring back to FIG. 15, Fire Chief Miller finds the W Department Store event 222 in the list 220 and selects the event 222 for further information. By way of example, FIG. 17 is a screenshot showing the search dashboard 250 displaying further details of the selected fire event. Once the fire event of the W Department Store 251 is selected on the search dashboard, each data for the parameters 252 for the fire event can be displayed in a graph view 253. In the graph view 253, a staffing chart for fire department and traffic control department 254 can be displayed as well as an equipment chart for fire trucks and ambulances 255. These data are displayed along the time axis so that the use of resources for the fire event can be chronologically displayed.

Figure 18:
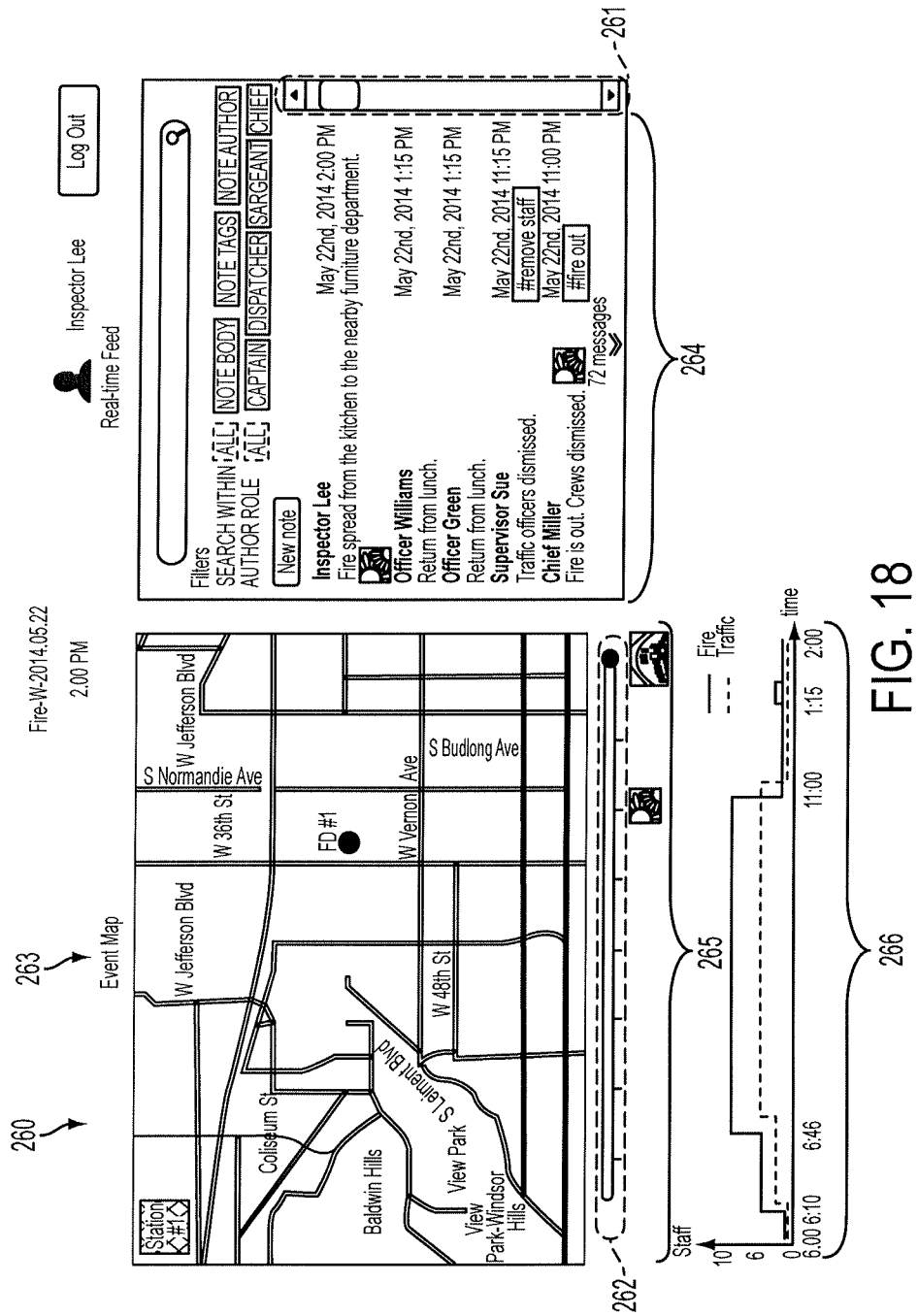
FIG. 18 is a screenshot showing, by way of example, a detailed review dashboard displaying all the event activities chronologically arranged and displayable by scroll bars.

Further, details for the fire event can be obtained through a detailed review dashboard. By way of example, FIG. 18 is a screenshot showing a detailed review dashboard 260 displaying all the event activities chronologically arranged and displayable by scroll bars. The format of the detailed review dashboard 260 is similar to a real-time dashboard, as further described supra with reference with FIGS. 5, 7-10, and 12. By using a scroll bar 261, 262, the reviewer can see all the activity data associated with the event object and movement of locations of actors appeared on an event map 263 chronologically. In a further embodiment, three panels 264-266 can be synchronized so that each panel shows activity data at the same chronological time. For instance, if a scroll bar 261 of the log 264 is scrolled to a certain data point, a staffing chart 266 also changes and the locations of fire trucks and ambulances on the event map 263 change as well to reflect the same time.

Figure 19:
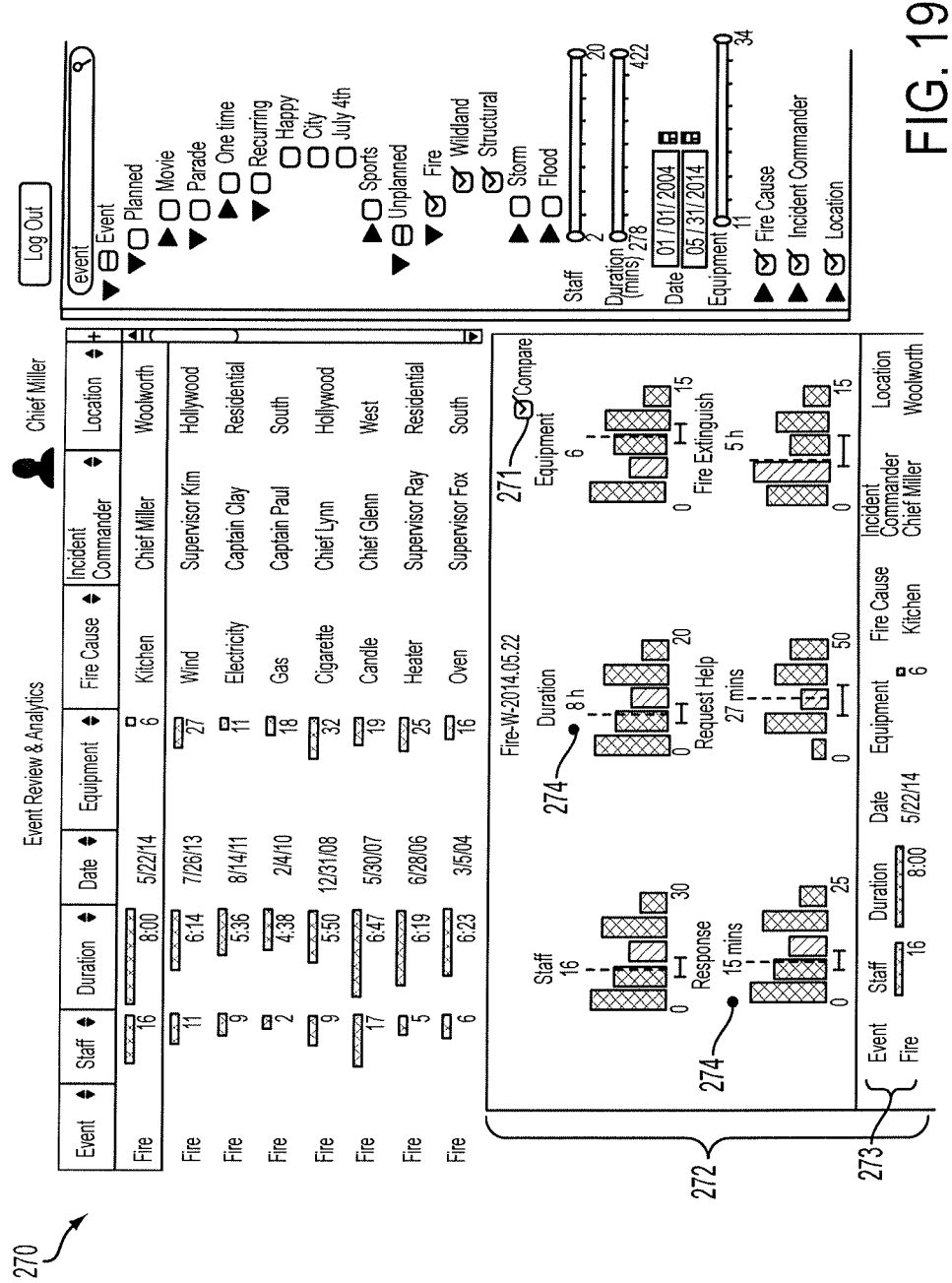
FIG. 19 is a screenshot showing, by way of example, the detailed review dashboard displaying graphs for parameter values of the recent fire events.

Each event object can be compared with other event objects on the detailed review dashboard. By way of example, FIG. 19 is a screenshot showing the detailed review dashboard 270 displaying graphs for parameter values of the recent fire events. When the fire event is reviewed in the search dashboard, a reviewer can have an option to compare the fire event data with other fire events. The comparison option 271 can be displayed for selection on the detailed review dashboard 270. In this example, data from four other recent fire events are used for the comparison. The results of comparison can be displayed on a parameter characterization panel 272 as a bar graph, line graphs, pictographs, and so on. Other formats of display for the parameter characterization panel are possible. In this example, a total number of crews assigned to the event ("Staff"), duration of the fire events ("Duration"), total number of equipment used for the event ("Equipment"), length of time for the crews to arrive at the fire scene ("Response"), length of time for the incident commander to determine further help ("Request Help"), and length of time to extinguish the fire ("Fire Extinguish") are displayed in the parameter characterization panel 272. The parameter values of the fire event currently reviewing 273 can be displayed differently in the graph from other parameter values, such as by colors, designs, and so on. In a further embodiment, the average value parameter can be calculated among the five fire events and shown as dotted lines as well as standard deviation. By reviewing each parameter value in this example, the reviewer can observe that the response time and the duration of the fire were longer than average. The parameter values, which are considered abnormal, can be highlighted 274 by colors, designs, and so on so that the reviewer can easily identify such abnormal parameter values.

Not only reviewing each event in detail but also further analytics for additional information from other resources can be performed in relation to the current analysis and displayed. For instance, besides reviewing the basic facts for the W Department Store fire event, Fire Chief Miller can obtain information, such as whether other crew members could have been added to the fire event, how far additional traffic officers are located at the time of the event, and what they are doing, through the search and review dashboard. In addition, the reviewer can obtain an overview of the resource usage at a municipal level if he compares metric data for the fire event to the total metric data of the whole resource in the city. Other forms of analytics are possibly performed.

Figure 20:
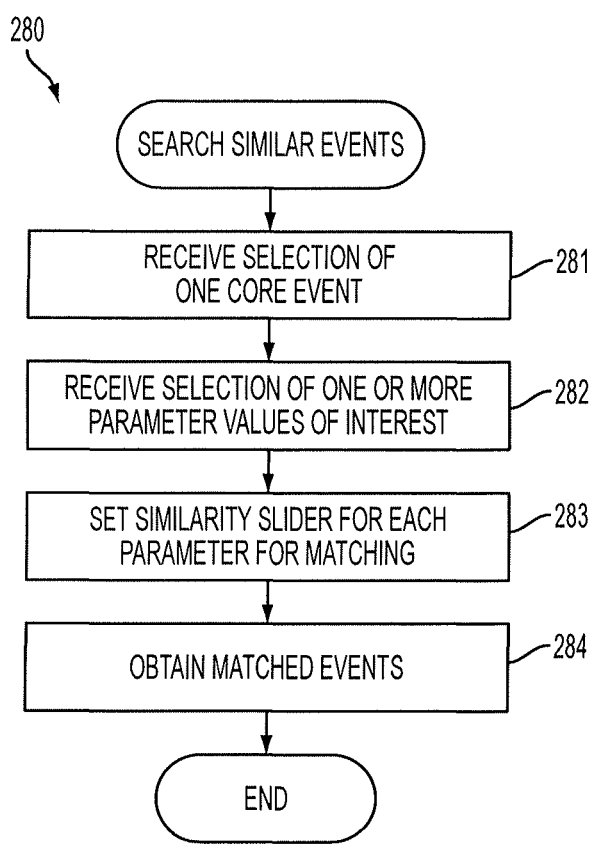
FIG. 20 is a flow diagram showing a routine for searching similar events for use in the method of FIG. 2.

Besides using the filters for search specific events, similar events can be searched and obtained based on the similarity of the parameter values for each event without using a specific set of search filters. Searching with the set of search filters possibly causes bias in the search results when there is a large number of search filters and a large number of events. In such a case, making decisions for the selection of filters can be difficult and confusing for reviewers. FIG. 20 is a flow diagram showing a routine 280 for searching similar events for use in the method of FIG. 2. A reviewer starts by selecting a core event to review on a search dashboard (step 281). When the reviewer would like to see other events, which show similar parameter values with the core event, the parameter values of interest are selected (step 282). Then, a similarity slider for each parameter is set by the reviewer (step 283). The similarity slider can set a range for each parameter values so that an event, which indicates a parameter value with the set range, can be captured. In a further embodiment, the similarity slider can include or exclude events according to their aggregate degree of difference in parameter values. Other mechanisms for the similarity slider are possible. By comparing each parameter value of interest with all the events in the database, only matched event objects are obtained and displayed (step 284).

Figure 21:
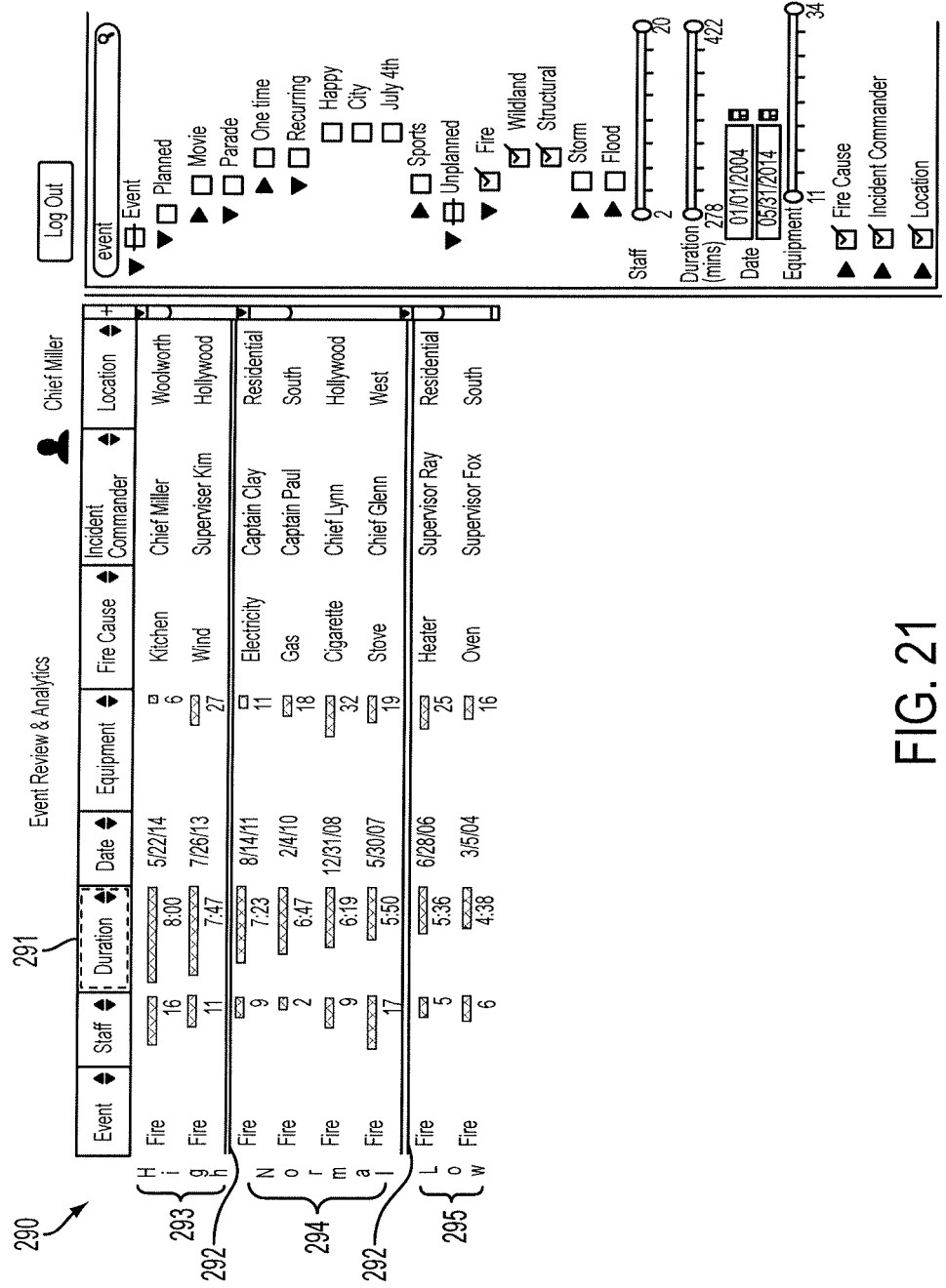
FIG. 21 is a screenshot showing, by way of example, the search dashboard displaying a list of events divided into bands according to values of a selected parameter.

Displaying bands on the list of event objects can assist a reviewer to adjust search filter parameter values when searching an event object, which matches with the parameter values. By way of example, FIG. 21 is a screenshot showing the search dashboard 290 displaying a list of event objects divided into bands according to values of a selected parameter. In this example, "duration" parameter 291 is selected. Then, all the fire events in the list are sorted by the length of the duration and the bands 292 divide the events as high 293, normal 294, and low 295. The "high" band 293 shows the duration parameter values are high. The "normal" band 294 shows the duration parameter values in the middle, and the "low" band 295 shows the duration parameter values at the low end. For instance, if a reviewer wants to narrow the search only to high parameter values, the parameter value as a filter can be set high. The bands also help the reviewer to recognize how the range for the parameter values is divided.

Figure 22:
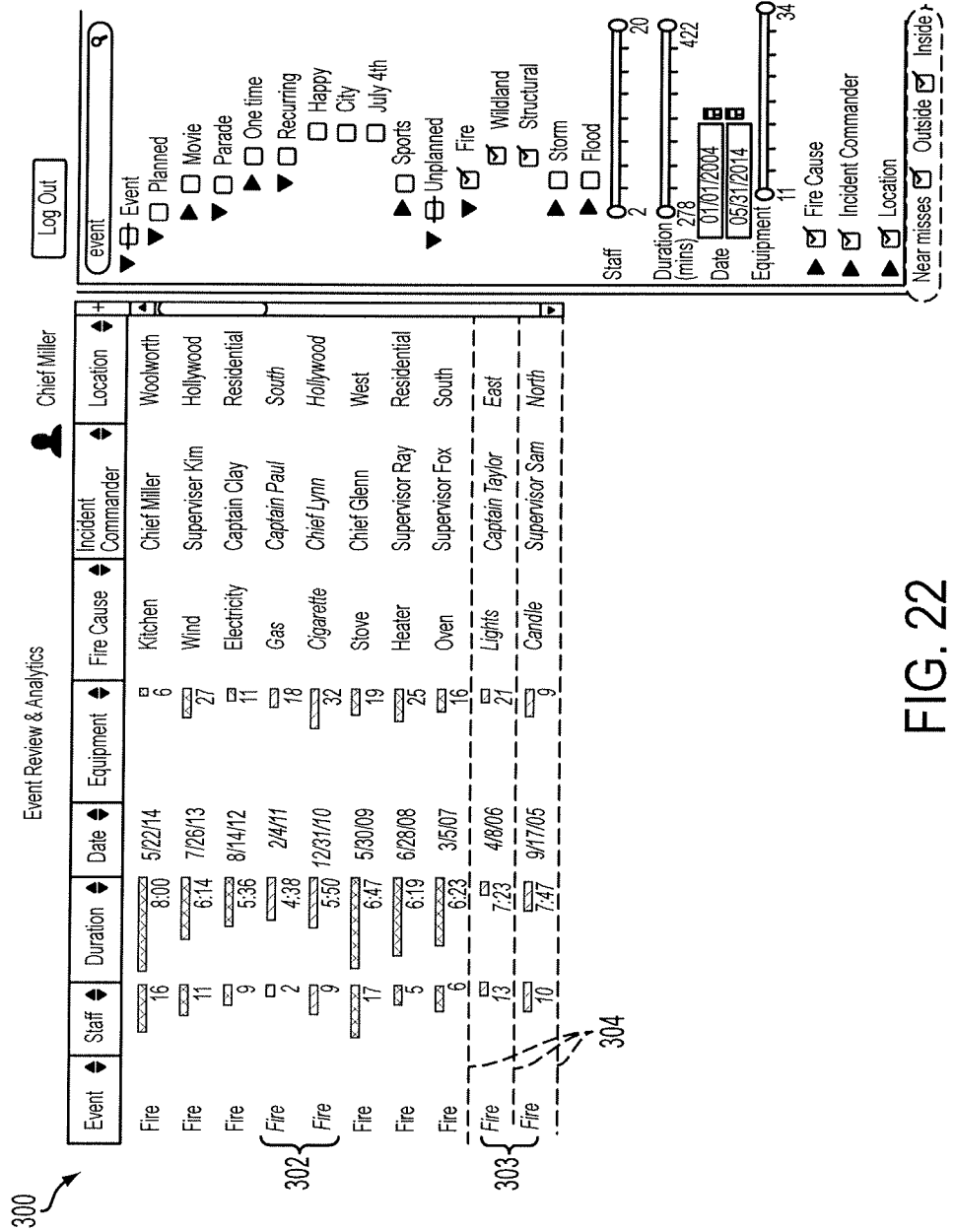
FIG. 22 is a screenshot showing, by way of example, the search dashboard displaying a list of events with highlighted near misses.

To distinguish events, which are barely included to the list of events, and also to distinguish events, which are barely excluded from the list of events by the search, the search dashboard can include an option to display such near miss events distinguished from other events. By way of example, FIG. 22 is a screenshot showing the search dashboard 300 displaying a list of event objects with highlighted near misses. The near miss option 301 can be indicated within the search filter selection section to identify inside near misses and outside near misses. The inside near misses 302 are the event objects, which are barely included in the event list according to the search filter set. The outside near misses 303 are the event objects that are barely excluded from the event list according to the search filter set. The highlights for the inside near misses can be done by using different colors, designs, and so on from other events on the list. Similarly, the highlights for the outside near misses can be done by using different colors, designs, and so on, but also can be separated from other events in the list by dashed lines 304.

Figure 23:
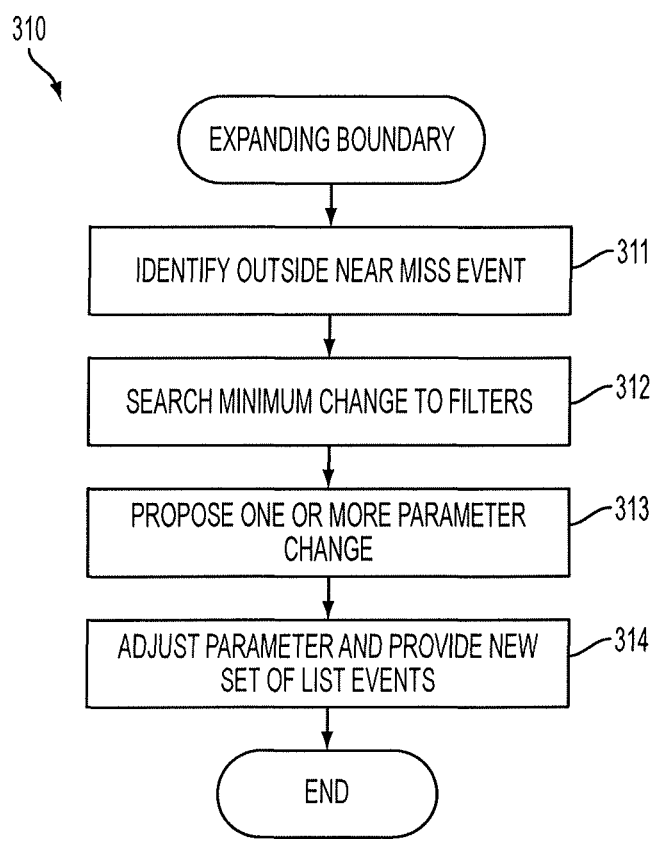
FIG. 23 is a flow diagram showing a routine for adjusting parameter values for search filters to include outside near misses.
Figure 24:
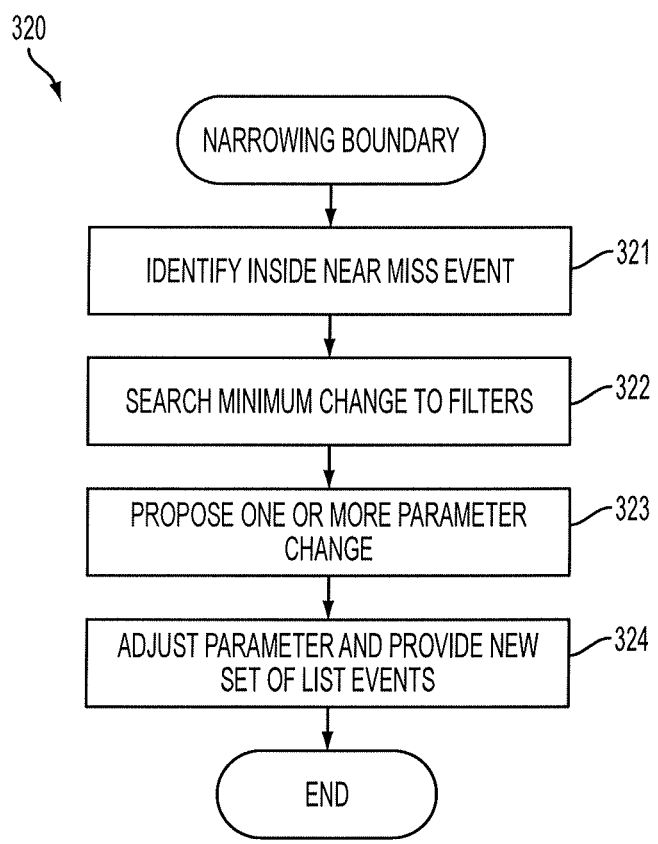
FIG. 24 is a flow diagram showing a routine for adjusting parameter values for search filters to exclude inside near misses.

Search filters can be modified by recognizing inside near miss event objects and outside near miss event objects. By reviewing the details of such inside near misses and outside near misses through a detailed review dashboard, a reviewer can possibly realize that the inside near misses should he excluded or the outside near misses should be included within the list. By including the outside near misses and excluding the inside near misses, one or more changes to the parameter values for search filters can be proposed for adjustment. FIG. 23 is a flow diagram showing a routine 310 for adjusting parameter values for search filters to include outside near misses. First, an outside near miss, which should be included to the event list, is identified (step 311). To include such outside near miss, one or more minimum changes to the parameter values for the search filters are searched (step 312). The minimum changes to the parameter values are proposed to a reviewer for selection (step 313). Each proposal can include what other event objects can be included with the minimum change. According to the selection of the minimum change, the parameter values are adjusted and a new set of event list is provided (step 314). Similarly, FIG. 24 is a flow diagram showing a routine 320 for adjusting parameter values for search filters to exclude inside near misses. First, an inside near miss, which should be excluded to the event list, is identified (step 321). To exclude such inside near miss, one or more minimum changes to the parameter values for the search filters are searched (step 322). The minimum changes to the parameter values are proposed to a reviewer for selection (step 323). Each proposal can include what other event objects can be excluded with the minimum change. According to the selection of the minimum change, the parameter values are adjusted and a new set of event list is provided (step 324).

Figure 25:
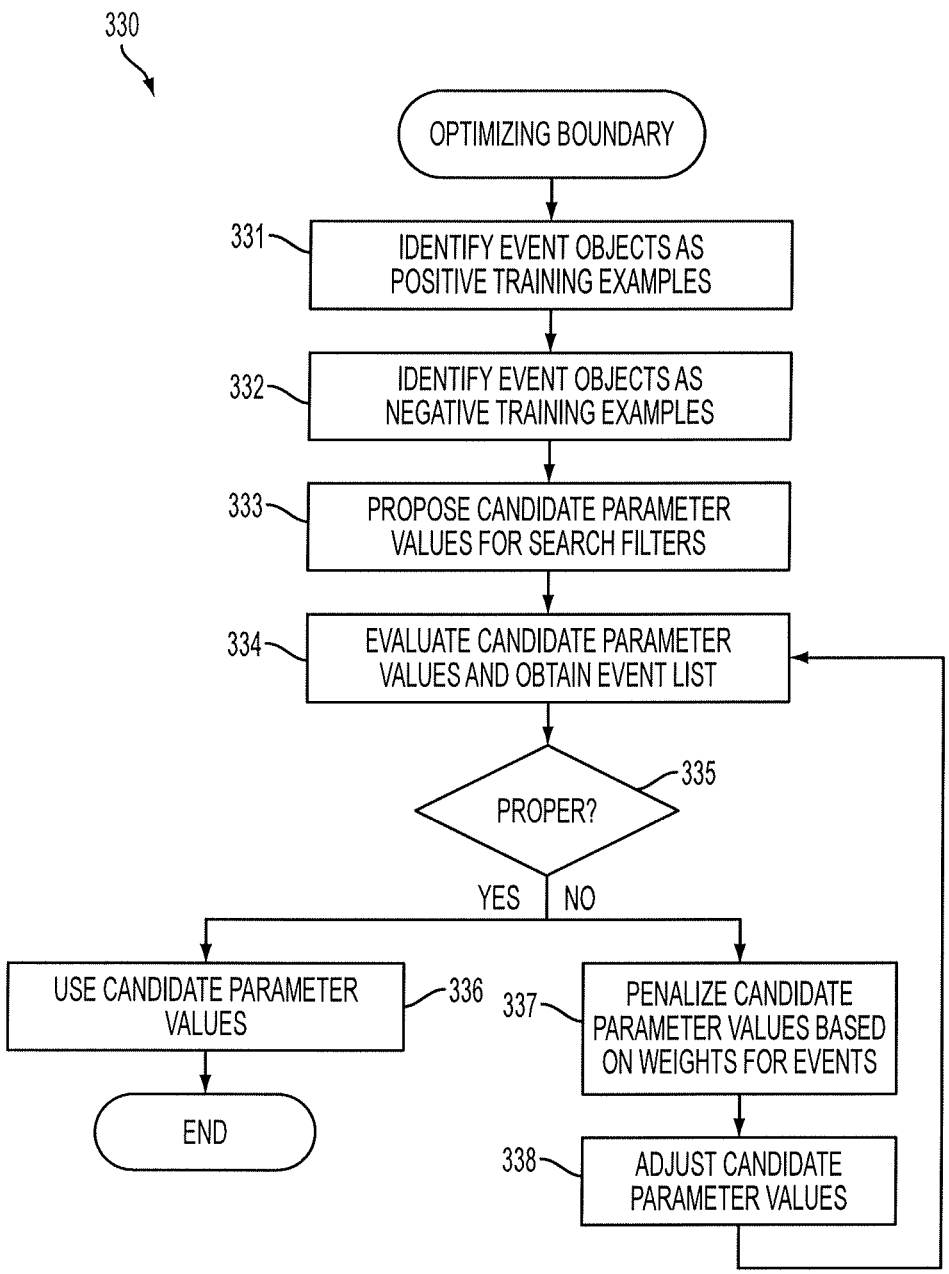
FIG. 25 is a flow diagram showing a routine for optimizing parameter values for search filters by using training examples.

By optimizing a boundary for selecting a set of event objects, only appropriate set of event objects can be displayed on the review dashboard and used for planning future events and predicting trends. The optimization is especially appropriate when there are too many event objects displayed based on a search using the search filter sets specified by a reviewer but the reviewer has difficulty specifying the boundary or the boundary cannot be defined with parameters. The search filters can be optimized by using training examples and supervised learning when the outside near misses are to be included and the inside near misses are to be excluded. For example, the search filters to be optimized can be a search filter for time, for time of day, for location, and so on. FIG. 25 is a flow diagram showing a routine 330 for optimizing parameter values for search filters by using training examples. The optimization can be performed by supervised learning with training examples. First, one or more events are identified as positive training examples for an optimized result (step 331). The positive training examples are event objects, which are identified to be included in a list, such as outside near misses to be included. Optionally, one or more events for a negative training example can be identified (step 332). The negative training examples are event objects, which are identified to be excluded in a list, such as inside near misses to be excluded. To correctly search and obtain a boundary for search, a candidate set of parameter values is proposed (step 333). The candidate set of parameter values is used for search through a database and obtain a list of event objects (step 334). If the positive training examples are identified in the list and the negative training examples are not on the list, the candidate set of parameter values is identified as proper (step 335), and the candidate set of parameter values can be used for a filter search (step 336). On the other hand, if the positive training examples were not included in the list and the negative training examples were included in the list, then the candidate set of parameter values can be penalized according to a weight for the event object (step 337). For instance, when a parameter for events in the list should be less than 6 hours of fire duration and still an event with 6.5 hours of fire event is included, the candidate set of parameter values can be penalized lightly. On the other hand, when a parameter for events in the list should be more than 2 hours of fire duration and still an event with 1.5 hours of fire event is included, then the candidate set of parameter values can be penalized heavily. Other examples of penalization are possible. According to the penalization level, the candidate set of parameter values is adjusted (step 338) and the adjusted set of parameter values can be used for further search to optimize (step 334). The optimization repeats the process until the candidate set of parameters stops misclassifying a list of event objects. Eventually, a reviewer can review the candidate set of parameter values and decide whether the candidate set is satisfactory.

Planning for Recurring Events

Reviewing and analyzing past events allows event planners to accurately predict impact of recurring events and provides better preparation for the events in the future. Agencies in a city, such as police department or traffic control department, handle many kinds of planned events, such as scheduled tourist events, conventions, parades, exhibitions, and so on. However, even when events are recurring and planned, the service requirements to the agencies can be different due to other factors, such as seasons, weather, and so on. Thus, analysis in detail on each past event will provide better understanding of need for their services at each event and further provide accurate prediction on the need. An example scenario can help to illustrate.

| Example Scenario 3 | |
|---|---|
| Actor | Activity |
| Manager Smith | Mr. Smith is a manager in a parking enforcement department. Manager Smith is planning traffic control resources for the next few months. There are typically seasonal variations that change the load and requirements for officers. In addition, there are recurring events that can have a significant impact on requirements. Manager Smith is making plans for the Happy Parade, which is an annual event for the city and scheduled next month. The city has requested parking officers to provide service for the event (traffic control, parking enforcement, etc.). The parade organizers have notified Manager Smith that the duration of this year's parade will be longer than last year. Last year's event was already captured by the episodic analytics system. Smith first wants to see how his organization did last year and then what the impacts of the extension of event duration are going to be. |

Figure 26:
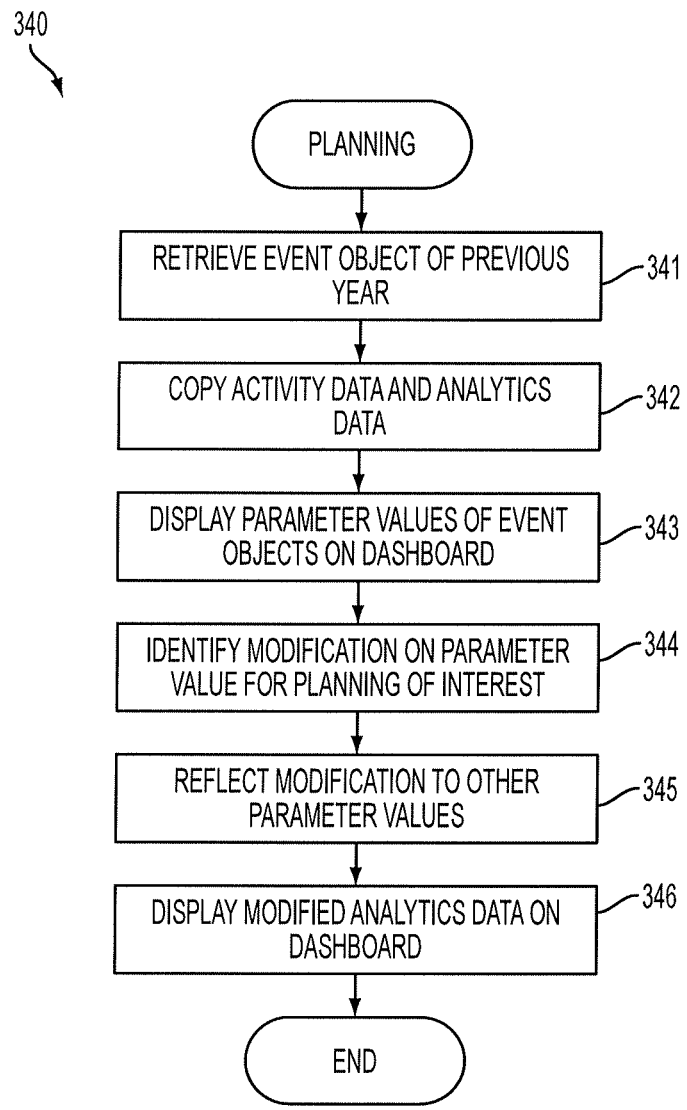
FIG. 26 is a flow diagram showing a routine for planning recurring events through an event planning and analytics dashboard for use in the method of FIG. 2.

A review dashboard allows an event planner to review activity data regarding the past event and gives a foundation to plan for the recurring event in the future based on the past event activity data. FIG. 26 is a flow diagram showing a routine 340 for planning recurring events through an event planning and analytics dashboard for use in the method of FIG. 2. Event planning can be typically done by receiving a selection of an event object from a planner that is similar to what the planner would like to plan. First, an event object from an earlier time is retrieved based on the selection (step 341). The activity data and analytics data of the selected year can be all copied (step 342). The copied activity data and analytics data can include parameter values based on the event class. The parameter values can be displayed on the event planning and analytics dashboard for planning (step 343). When a reviewer would like to modify a parameter value of interest, the reviewer can do so on the event planning and analytics dashboard by manipulating and adjusting the parameter value (step 344). Models and computer modules can be used to express relationships between parameter values. Other types of programs for expressing relationships between parameter values are possible. The models and modules can recognize the modification made to the parameter value and calculate the changes to other parameter values accordingly based on the modification (step 345). Finally, the modified parameter values can be displayed on the dashboard (step 346). If the modification is done by the planner, the data is stored as a new planned event in a database.

Figure 27:
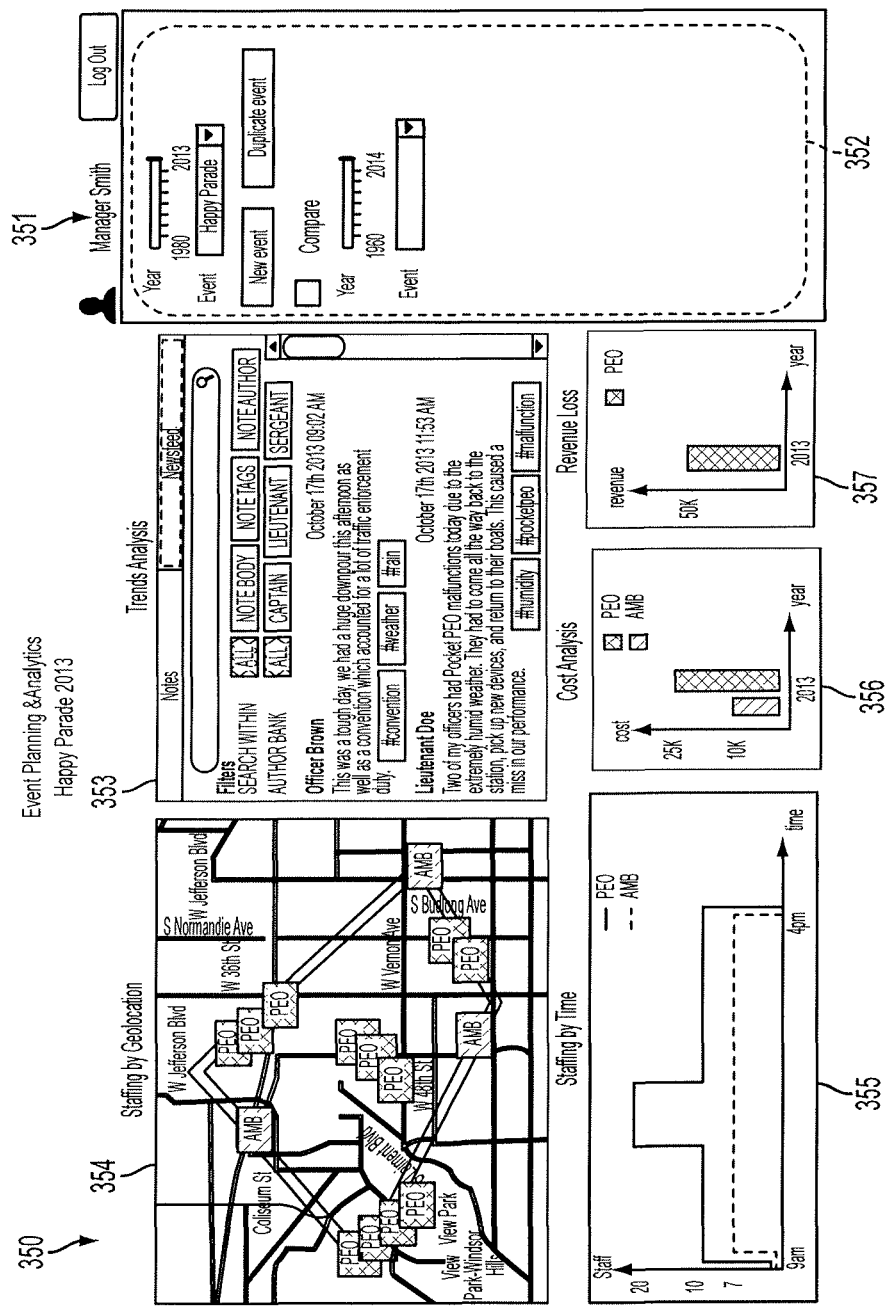
FIG. 27 is a screenshot showing, by way of example, a review dashboard displaying an event of a previous year.

The event planning and analytics dashboard allows users to plan a future event based on past events. By way of example, FIG. 27 is a screenshot showing a review dashboard 350 displaying an event object of a previous year. Manager Smith 351 first searches the Happy Parade occurred in 2013 through a search filter set 352. Once the search is performed, the event planning and analytics dashboard can show logs of activity data 353 and analytics with parameter values based on the activity data, such as a map 354 showing where officers were deployed, a staffing chart 355 of the parking enforcement officer (PEO) and ambulance (AMB), cost analysis of human labor 356, and the impact on citation revenue due to the parade assignment 357. Other types of analytics can be displayed.

Figure 28:
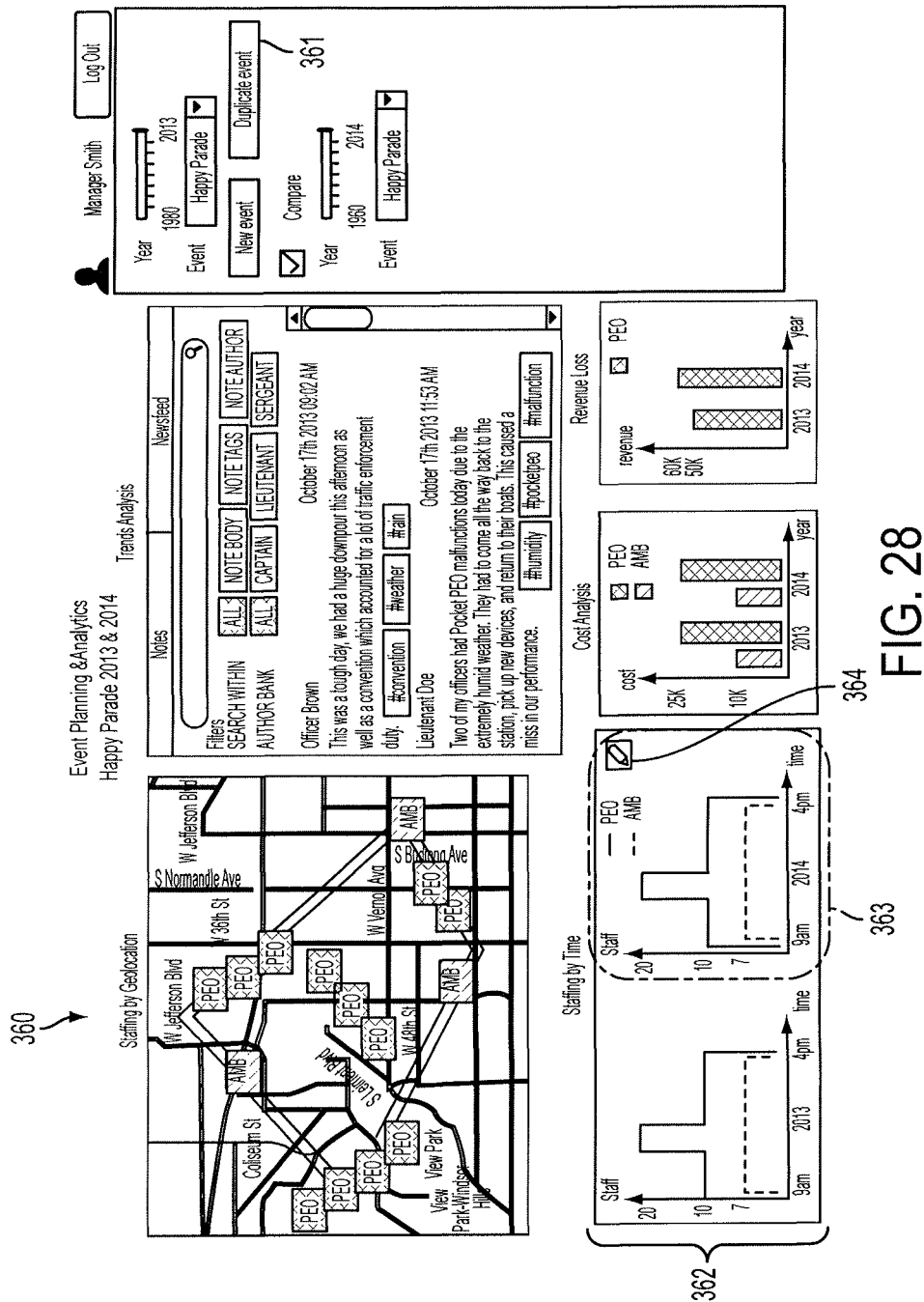
FIG. 28 is a screenshot showing, by way of example, the event planning and analytics dashboard displaying analytics data for planning a recurring event.
Figure 29:
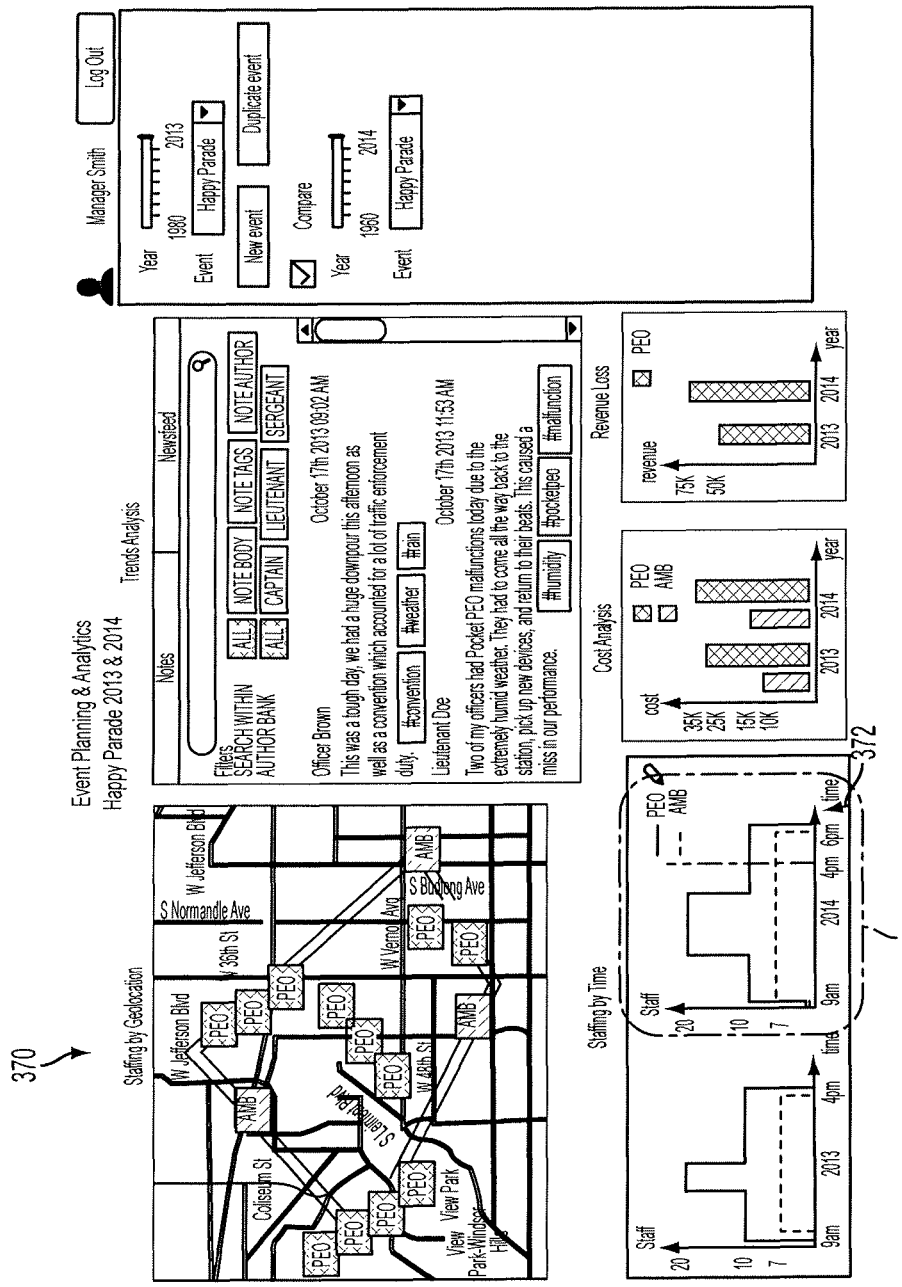
FIG. 29 is a screenshot showing, by way of example, the event planning and analytics dashboard displaying modified analytics data for planning.

A recurring event can be easily and efficiently planned by using the analytics data from an earlier time on an event planning and analytics dashboard. By way of example, FIG. 28 is a screenshot showing the event planning and analytics dashboard 360 displaying analytics data for planning a recurring event. In this example, the analytics data of the Happy Parade occurred in 2013 is used as a base for planning to duplicate the analytics data on the event planning and analytics dashboard. Duplication of the analytics data from the previous year can be done by using a "Duplicate event" button 361 on the search filter set. A staffing chart 362 can include two charts, one chart for the actual staffing chart for the Happy Parade in 2013 and the other chart for planning 363 for the Happy Parade 2014. The staffing chart for planning 363 provides an editing function 364 to manually change a data of the chart. For instance, Manager Smith understands that the Happy Parade in 2014 will be longer than the last year and he can extends the crew assignment time for the parade by manipulating the chart, such as dragging a data point to another. By way of example, FIG. 29 is a screenshot showing the event planning and analytics dashboard 370 displaying modified analytics data for planning. The editable staffing chart 371 for planning the Happy Parade in 2014 shows that the assignment duration for PEO and AMB is extended 372 from 4:00 pm to 6:00 pm according to the chart manipulation by Manager Smith.

Figure 30:
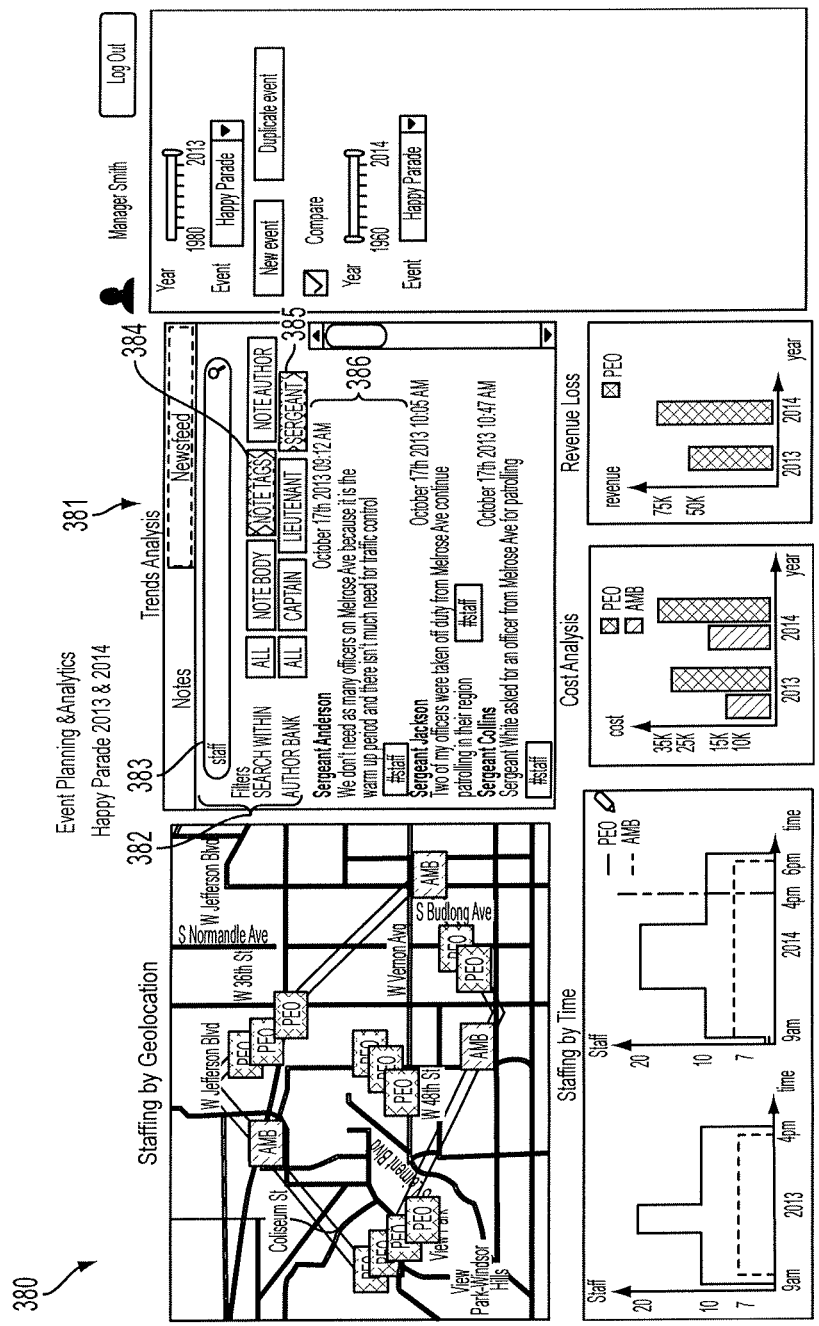
FIG. 30 is a screenshot showing, by way of example, the event planning and analytics dashboard displaying activity data searched by search filters.

The event planning and analytics dashboard can display any type of analytics data, including the analytic data from the series of event or other sources. Other types of analytics data are possible. The analytics data can include parameter values corresponding to event classes of the event objects. When a selection of analytics to display is changed, the analytics data can be replaced with another analytics data or added to the event planning and analytics dashboard. Such replacement or addition can be performed by using search filters. Other forms of replacement and addition of analytics data to the event planning and analytics dashboard are possible. By way of example, FIG. 30 is a screenshot showing the event planning and analytics dashboard 380 displaying activity data searched by search filters. The log 381 typically displays all the activity data regarding the 2013. Happy Parade chronologically. Search filters 382 can be used to display only the activity data, which match with the search filters. An example scenario can also help to illustrate.

| Actor | Activity |
|---|---|
| Manager Smith | From the prediction, Manager Smith sees an increase in staffing level and citation revenue loss, because more officer time is needed. He wants to see where he can improve the efficiency to mitigate this impact. He searches 'staff' in the note search box, and the system then displays a list of staff related notes. Manager Smith sees multiple notes written by officers in the field last year indicating they didn't need that many officers in the field at the beginning of the parade (9 am to 10 am) because there weren't many parade participants and audience during that warm up time and labor needs for traffic control was low. |

In this example, Manager Smith sets search filters of "staff" 383 for a tag 384 and also narrows the search to the activity data, which was written by "sergeant" 385. The searched results of activity data are displayed on the log, which includes a note 386 from Sergeant Anderson reporting that many officers were not required at the beginning of the parade in 2013.

Figure 31:
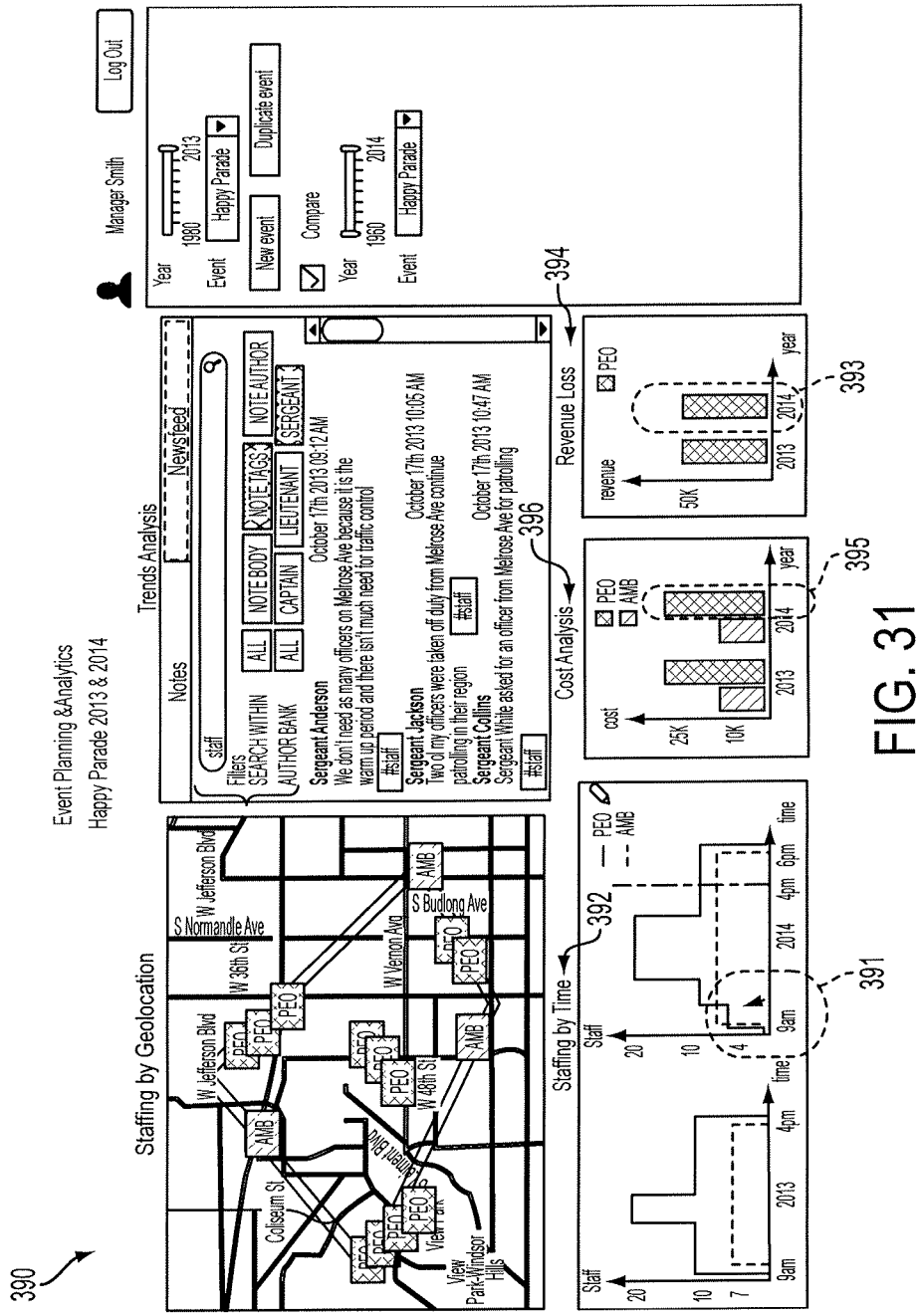
FIG. 31 is a screenshot showing, by way of example, the event planning and analytics dashboard displaying modified analytics data on the staffing chart, cost analysis chart, and revenue loss chart.

A reviewer can modify analytics data of past event objects for planning a future event on the event planning and analytics dashboard. By way of example, FIG. 31 is a screenshot showing the event planning and analytics dashboard 390 displaying modified analytics data on the staffing chart, cost analysis chart, and revenue loss chart. In this example, Manager Smith reduces a number of PEO staff 391 between 9:00 am and 10:00 am by dragging the staffing level down on the staffing chart 392. Such modification to the parameter value is reflected to the rest of the analytics data. By reducing the number of PEO staff, the citation revenue loss 394 expected in 2014 is reduced to the level similar to the level of 2013 on the citation revenue loss chart 394 and the labor cost of PEO staff 395 is concurrently reduced on the labor cost chart 395. According to the planning by Manager Smith, the overall labor cost and citation revenue loss can be maintained in the same level with the last year even though the duration of the Happy Parade in 2014 increases.

Generating Overview Reports

Similar to reviewing each single event, multiple events can be concurrently reviewed and compared for overview reports as long as the multiple events share one or more parameters for analytics. Such parameters can include time, location, revenue loss, labor cost, and frequency of occurrence of events. Analysis among various classes of events can provide useful and unexpected findings in the data. An example scenario will help to illustrate.

| Example Scenario 4 | |
|---|---|
| Actor | Activity |
| Manager Smith | Manager Smith browses the events database to generate an overview report that captures the most useful findings about city events over the past 14 years. Manager Smith selects an overall view by choosing the year interval [2000-2013]. Manager Smith is interested in looking at averages for events occurring any time in the year so he chooses the average analytics button and does not check the group by season button. |

Figure 32:
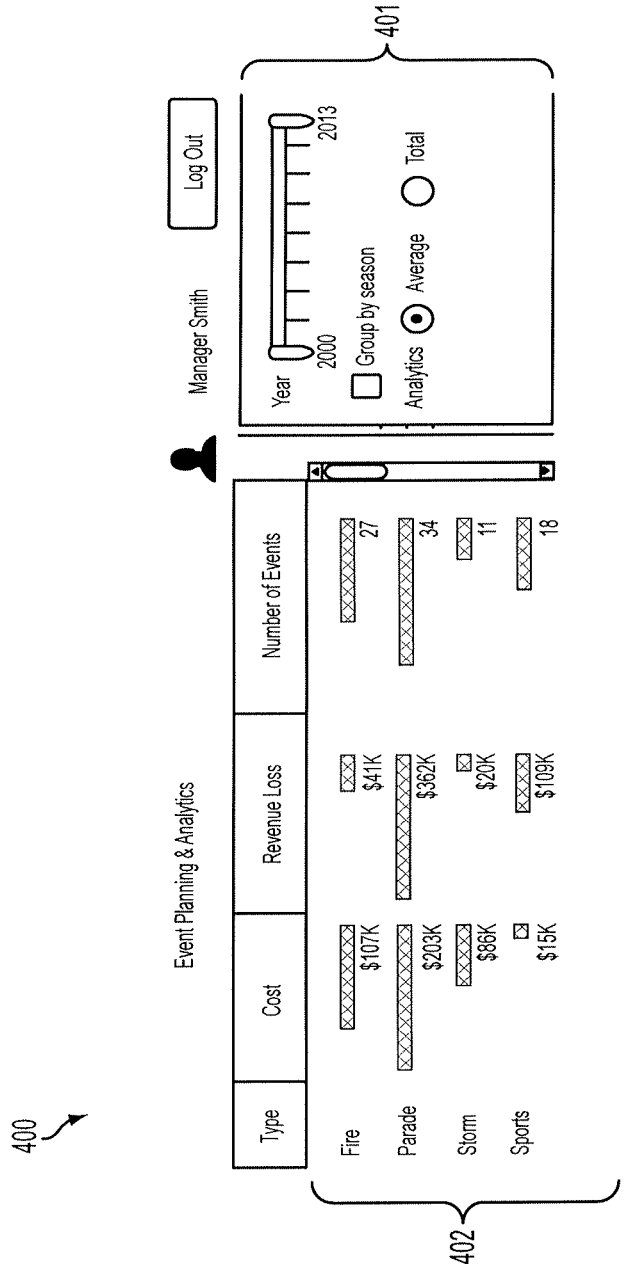
FIG. 32 is a screenshot showing, by way of example, the event planning and analytics dashboard displaying a list of events obtained through search filters.

Analytics for multiple data sets such as multiple classes of events for over multiple years can be performed by aggregating the data of all the events. By way of example, FIG. 32 is a screenshot showing the event planning and analytics dashboard 400 displaying a list of events obtained through search filters. The search filter set 401 can provide an option to select a range of years, an option to display the results as average values or total values, and an option to group the results by season. Other search filter sets are possible. The search results 402 can be displayed as aggregate of the events in each class, such as "fire," "parade," "storm," and "sports."

Analyzing Trends of Events

As all the data associated with events are organized as a part of event objects by now, searching and reviewing certain event objects become easy. Automatic trend analysis with a set of search filters can even provide an easier way to obtain meaningful comparison of the data associated with events in two or more data sets than manually reviewing each event object separately and can also identify anomalies and trends among the data sets. A trend is a general tendency or inclination determined by the examination of a particular attribute over time. An organization is typically interested in finding a tendency in performance of organization and tendency of other factors, such as tendency in city events in general. Some trend examples may help to illustrate. The trend analysis can include statistical tests and evaluations to determine whether correlations are statistically significant. In some variations of trend analysis, clustering of event objects may be performed according to their parameter values. Anomalous values of the parameters may be identified. At the analyst's discretion, anomalous events may also be excluded from the trend analysis.

| Trends in City Events |
| --- |
| Over the past two months, there has been a 120% increase in accidents on three shopping blocks. 69% of these were between 10:00 am and noon. Over the last six months, there has been a 30% increase in the number of arson fires in the Hollywood district. About 50% of these take place on weekend evenings. There has been an increase of 35% in the number of break-ins in hatchback cars in the past six months in the Laurelhurst area. There has been a 50% increase in the number of robberies in the Oakhurst district. About 35% of these take place within three blocks of freeway exits. |

| Trends in Organizational Performance |
| --- |
| Over the last six months, the times to put out two-alarm apartment fires are 30% higher in the last week of the month than other weeks. Over the last year, there has been a 100% increase in the time officers spent to clear traffic accidents on Hollywood Boulevard for midafternoon midweek accidents. Over the past year when Officer John Smith works beat 24, she picks up only meter violations. This differs from the usual spread of violation types found by other officers on the same beat. Over the last six months, Officer Brown picks up almost all of her citations in the first two hours of her shift even though she logs little service activity during the rest of the day. |

The above-illustrated examples can be obtained through the trend analysis focusing on metric data or qualifiers. Tracking metrics in the analytics can identify some trends among event objects. Examples of the metrics can be a number of arson fires, number of robberies, time to clean an accident, diversity measure of the spread of violation types, time to put out fires, revenue loss, lives lost, time to respond, and so on. Further, tracking certain qualifiers, such as time period or location, can identify a trend. Examples of the time period qualifier can be last six months, between 10:00 am and 12:00 am, on weekend evenings, in the last week of the month, and so on. Examples of the location qualifier can include on three shopping blocks, within the area of Seattle, and so on.

Figure 33B:
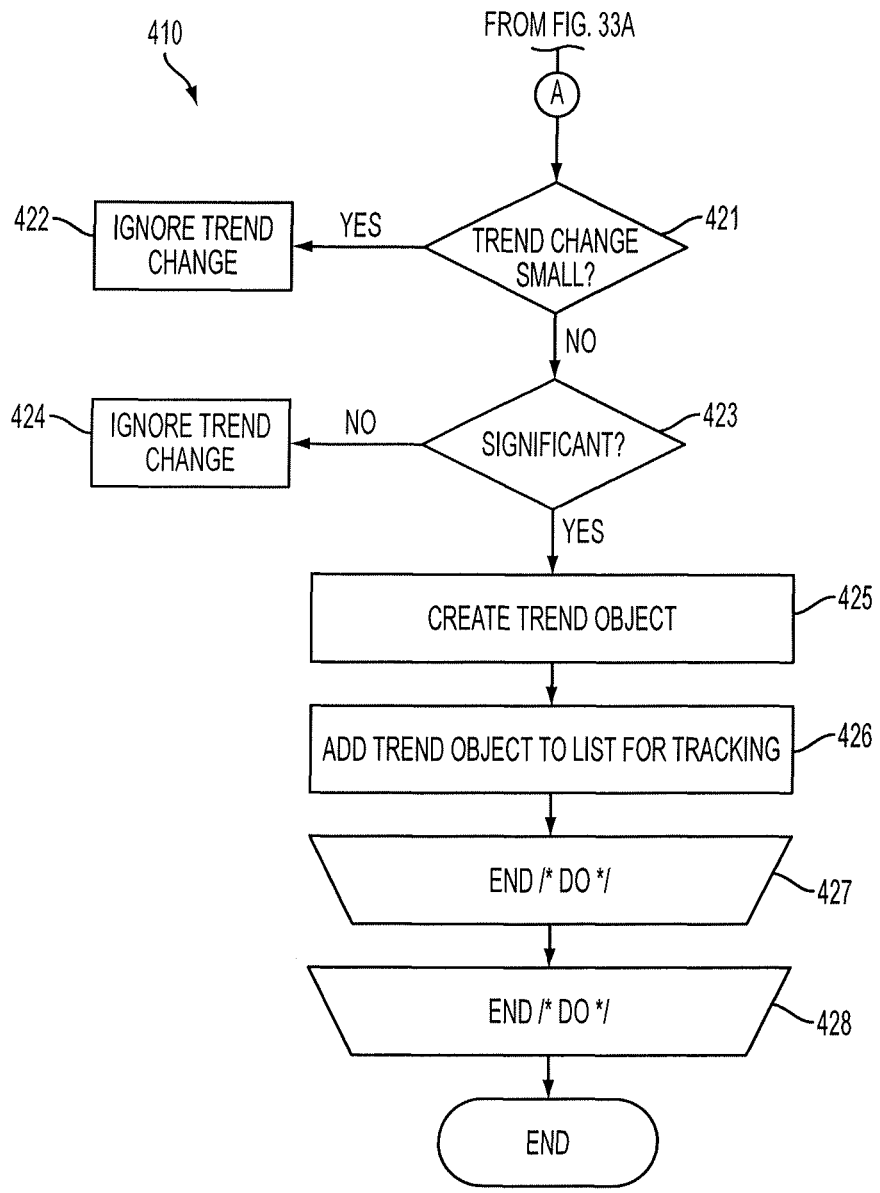

The trend analysis can be carried out as a search process using search filters, especially using a set of parameters. FIGS. 33A-33B are flow diagrams showing a routine 410 for performing trend analysis for use in the method of FIG. 2. Each class of event is separately selected and processed for trend analysis (steps 411-418). Further, each parameter of the class of event is selected and processed for trend analysis (steps 412-417). Typically, a reviewer desires to see a certain trend in a specified time period when the data in the specified period is compared with data in other time frames. Thus, first a preferred time period for trend analysis and other time frames, typically previous time periods are defined (step 413). Then, all the event objects in the preferred time period and in previous time periods are retrieved from a database (step 414), preferably by using search filters. For the event objects in the preferred time period, spatial filters are applied to narrow and discover event objects limited in the geographical space (step 415). The spatial filters for the trend analysis can include the following examples.

| Examples of spatial filters for trend analysis |
| --- |
| Urban map regions: zip code areas, real estate regions, school districts, neighborhoods, parks. Transit related regions: train lines, bus lines, near train stations, bus stations, bus stops, taxi zones, metered areas, freeways, freeway exits. Commerce-related zones: retail shopping streets, residential streets, mixed-use streets, tourist areas, light industry areas. |

Further, for the event objects in the preferred time period, temporal filters are also applied to narrow and discover event objects limited in the certain period of time (step 416). The temporal filters for the trend analysis can include the following examples.

| Examples of temporal filters for trend analysis |
| --- |
| Intervals in a day: mornings, afternoons, evenings, and late night. Intervals from daily human rhythms: working hours, school hours, rush or heavy commuting hours, day light hours, and train and bus arrival times. Intervals in a working day: working shifts in the organization, first and last hours of the shift. Intervals in a week: individual week days, working days, weekends Holidays: national holidays, and special event days. Seasonal intervals: school seasons, weather seasons, and sport seasons. |

In a further embodiment, fast Fourier analysis or similar analysis can be used to identify repetitive rhythms in event objects for performing trend analyses.

Once the event objects are narrowed by filters, trends in the event objects for the preferred time period are obtained (step 417). If a sample size of the event objects for the preferred time period is too small (step 418), the identified trends will be ignored (step 419). If the sample size of the event objects is large enough, the identified trends are compared with the event objects identified in the previous time periods and trend changes between them are discovered (step 420). If the trend change is small (step 421), the identified trend change will also be ignored (step 422). If the trend change is not small, but the trend change is not significant (step 423), similarly the trend change is ignored (step 424). Once a significant trend change is identified, a trend object for the trend is created (step 425). For example, when a parameter trend shows a 10% rise in value on weekends but 80% of the change actually occur on weekend evenings, the reviewer would probably be interested only in seeing the most specific and significant candidate for the trend. As an example, a trend may catch slowly rising parameters that yield significant shift over time, such as 3% per month over several years. Further, another example can be recurring or periodic changes at human scale intervals. The trend object is added to a list for tracking and identifying such a trend when the trend analysis is performed (step 426).

Once the trend analysis is performed and a set of event objects are listed for review, a reviewer can go through the list to see whether the event objects listed are actually of interest. If the list includes event objects, which is outside of scope of interest, then further filtering can be done. The adjustment can be done manually changing the parameters in the filter sets. Other adjustment methods are possible. Further, the trend analysis can also identify single data associated with events, which is considered abnormal compared to the rest of the data in addition to identifying a tendency among series of data associated with events is a certain period of time but also. A dashboard for trend analysis can display the candidate trends sorted by event classes and significance as controlled by a reviewer. The reviewer can select any of the candidate trends and examine the each data set.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for planning recurring events, comprising:
   maintaining a plurality of event objects for past events in a database, wherein each event object comprises activity data and is assigned an event class that is associated with a set of parameters for analyzing that event object;
   receiving an automatic trigger identifying a start of a new event, wherein the trigger comprises one of an alarm, phone call, detection by sensor, and message and the new event comprises a real world event; and
   automatically generating a new event object for the new event from the event object for one of the past events upon an occurrence consisting of receipt of the trigger identifying the start of the new event, comprising:
      comparing the new event with parameters of the event objects;
      receiving a selection of one of the event objects from the database as a model event object for the new event object of the new event based on a similarity of the parameters of the selected event object and the new event;
      copying the parameter values associated with the model event object for the new event object for the new event;
      modifying at least one of the copied parameter values to conform with the new event;
      reflecting the modification to other copied parameter values that are dependent on the modified parameter value; and
      storing the modified parameters with the new event object for the new event; and
   during a duration of the new event, continuously collecting data regarding the new event.

2. A method according to claim 1, wherein the model event object was previously created and is selected from the database.

3. A method according to claim 1, further comprising:
   identifying the parameter values which are dependent on the modified parameter values and the parameter values which are independent to the modified parameter values;
   modifying the dependent parameter values based on the modified parameter values; and
   displaying the modified parameter values, dependent modified parameter values, and independent parameter values.

4. A method according to claim 1, further comprising:
   computing for each event object, a value of each of the parameters using at least one of the tags, the structured data, and the unstructured data of the activity data.

5. A method according to claim 1, wherein the model event object is for a future event and is based on a previous event represented by the retrieved event object.

6. A method according to claim 1, further comprising:
   copying the model event object; and
   modifying the parameter values of the copied model event object for a recurring event.

7. A method according to claim 1, further comprising:
   generating activity data for the model event object; and
   constructing at least one of a graph, map, and data log for the activity data.

8. A method according to claim 7, further comprising:
   receiving a query for specific activity data associated with the model event object; and
   providing the requested specific activity data.

9. A method according to claim 1, further comprising:
   receiving a query for specific event objects; and
   providing the requested specific event objects.

10. A method according to claim 9, further comprising:
    analyzing the activity data for each of the provided specific event objects; and
    identifying one or more of a trend in performance of the provided specific event objects based on the analyzed activity data.

11. A computer-implemented system for planning recurring events, comprising:
    a database to maintain a plurality of event objects for past events, wherein each event object comprises activity data and is assigned an event class that is associated with a set of parameters for analyzing that event object; and
    a server comprising a central processing unit, memory, an input port to receive the event objects from the database, and an output port, wherein the central processing unit is configured to:
       receive an automatic trigger identifying a start of a new event, wherein the trigger comprises one of an alarm, phone call, detection by sensor, and message and the new event comprises a real world event; and
       automatically generate a new event object for the new event from the event object for one of the past events upon an occurrence consisting of receipt of the trigger identifying the start of the new event, comprising:
          compare the new event with parameters of the event objects;
          receive a selection of one of the event objects from the database as a model event object for the new event object of the new event based on a similarity of the parameters of the selected event object and the new event;
          copy the parameter values associated with the selected event object for the new event object for the new event;
          modify at least one of the copied parameter values of the model event object to conform with the new event;
          reflect the modification to other copied parameter values that are dependent on the modified parameter value; and
          store the modified parameters with the event object for the new event; and
       during a duration of the new event, continuously collect data regarding the new event.

12. A system according to claim 11, wherein the model event object was previously created and is selected from the database.

13. A system according to claim 11, wherein the central processing unit performs the following:
    identify the parameter values which are dependent to the modified parameter values and the parameter values which are independent to the modified parameter values;
    modify the dependent parameter values based on the modified parameter values; and
    display the modified parameter values, dependent modified parameter values, and independent parameter values.

14. A system according to claim 11, wherein the central processing unit computes for each event object, a value of each of the parameters using at least one of the tags, the structured data, and the unstructured data of the activity data.

15. A system according to claim 11, wherein the model event object is for a future event and is based on a previous event represented by the retrieved event object.

16. A system according to claim 11, wherein the central processing unit copies the model event object and modifies the parameter values of the copied model event object for a recurring event.

17. A system according to claim 11, wherein the central processing unit generates activity data for the model event object and constructs at least one of a graph, map, and data log for the activity data.

18. A system according to claim 17, wherein the central processing unit receives a query for specific activity data associated with the model event object and provides the requested specific activity data.

19. A system according to claim 11, wherein the central processing unit receives a query for specific event objects and provides the requested specific event objects.

20. A system according to claim 19, wherein the central processing unit analyzes the activity data for each of the provided specific event objects and identifies one or more of a trend in performance of the provided specific event objects based on the analyzed activity data.

* * * * *